United States Patent [19]
Lorbiecki

[11] Patent Number: 5,975,629
[45] Date of Patent: *Nov. 2, 1999

[54] VEHICLE SEAT WITH INFLATABLE BLADDER

[76] Inventor: James R. Lorbiecki, 4457 N. 56th St., Milwaukee, Wis. 53218

[*] Notice: This patent is subject to a terminal disclaimer.

[21] Appl. No.: 08/914,514

[22] Filed: Aug. 18, 1997

Related U.S. Application Data

[63] Continuation of application No. 08/587,111, Jan. 11, 1996, Pat. No. 5,658,050.

[51] Int. Cl.$^6$ ........................................................ B62J 1/26
[52] U.S. Cl. ................. 297/200; 297/284.6; 297/452.41; 297/DIG. 3; 297/195.12; 297/243; 137/625.46; 251/9
[58] Field of Search ........................... 297/452.41, 284.6, 297/DIG. 3, 195.12, 200, 243; 137/625.44; 251/9

[56] References Cited

U.S. PATENT DOCUMENTS

| | | |
|---|---|---|
| 2,612,645 | 10/1952 | Boland . |
| 3,112,956 | 12/1963 | Schick et al. . |
| 3,276,047 | 10/1966 | Emery . |
| 3,296,635 | 1/1967 | O'Hanlan . |
| 3,297,023 | 1/1967 | Foley . |
| 3,303,518 | 2/1967 | Ingram . |
| 3,446,203 | 5/1969 | Murray . |
| 3,966,146 | 6/1976 | Roberts . |
| 4,114,214 | 9/1978 | VonHeck . |
| 4,115,885 | 9/1978 | Davis . |
| 4,175,297 | 11/1979 | Robbins et al. . |
| 4,497,517 | 2/1985 | Gmeiner et al. . |
| 4,629,248 | 12/1986 | Mawbey . |
| 4,707,027 | 11/1987 | Horvath et al. . |
| 4,775,185 | 10/1988 | Scholin et al. . |
| 4,796,948 | 1/1989 | Paul et al. . |
| 4,842,330 | 6/1989 | Jay . |
| 4,852,195 | 8/1989 | Schulman . |
| 4,864,671 | 9/1989 | Evans . |
| 4,915,124 | 4/1990 | Sember, III . |
| 4,929,026 | 5/1990 | Barbelet . |
| 5,052,068 | 10/1991 | Graebe . |
| 5,054,854 | 10/1991 | Pruit . |
| 5,069,837 | 12/1991 | Sember, III et al. . |
| 5,076,643 | 12/1991 | Colasanti et al. . |
| 5,082,326 | 1/1992 | Sekido et al. . |
| 5,090,076 | 2/1992 | Guldager . |
| 5,096,529 | 3/1992 | Baker . |
| 5,137,329 | 8/1992 | Neale . |
| 5,163,737 | 11/1992 | Navach et al. . |

(List continued on next page.)

*Primary Examiner*—Peter M. Cuomo
*Assistant Examiner*—Rodney B. White
*Attorney, Agent, or Firm*—Nilles & Nilles S.C.

[57] ABSTRACT

A vehicle seat having a bladder with more than two inflatable chambers and an integral control flap, all of one piece, integral construction. To maximize inflatable volume of each chamber, each chamber preferably has a sidewall portion that is generally perpendicular. The control flap has passages in communication with the chambers and valving for selectively controlling inflation of the chambers. Valving preferably includes pinch valves having a generally T-shaped body with legs that pinch passages in the control flap to retain gas in a chamber and selectively inflate or deflate the chamber. The bladder is connected to a gas supply having a pump in communication with a reservoir for storing a charge of pressurized gas in the reservoir so that the pump need not immediately operate when gas is needed to inflate a chamber. To maintain a charge of gas in the reservoir, the gas supply preferably includes a pressure switch for energizing the pump when the reservoir pressure drops below a lower threshold and deenergizing the pump when pressure rises above an upper threshold. A preferred bladder has a chamber for cushioning the thighs of a seat occupant, a chamber for cushioning the buttocks and can have a chamber for providing lumbar support. A bladder of this invention can be assembled as part of a motorcycle seat having a bladder for the driver and a bladder for the passenger. The bladder also can be used in automotive and off road vehicle seating applications.

50 Claims, 15 Drawing Sheets

U.S. PATENT DOCUMENTS

| | | |
|---|---|---|
| 5,189,742 | 3/1993 | Schild . |
| 5,193,237 | 3/1993 | Holdredge . |
| 5,277,474 | 1/1994 | Hannagan et al. . |
| 5,280,997 | 1/1994 | Andres et al. . |
| 5,292,175 | 3/1994 | Artz . |
| 5,369,829 | 12/1994 | Jay . |
| 5,419,612 | 5/1995 | Rassekhi ................................ 297/200 |
| 5,450,638 | 9/1995 | Johnson . |
| 5,469,592 | 11/1995 | Johnson . |
| 5,473,313 | 12/1995 | Graebe, Jr. . |
| 5,487,197 | 1/1996 | Iskra, Jr. et al. . |
| 5,503,428 | 4/1996 | Awotwi et al. . |
| 5,524,961 | 6/1996 | Howard . |
| 5,570,716 | 11/1996 | Kamen et al. ........................ 297/284.6 |
| 5,601,332 | 2/1997 | Schultz et al. . |
| 5,634,685 | 6/1997 | Herring .......................... 297/452.41 X |
| 5,658,050 | 8/1997 | Lorbiecki ............................ 297/452.41 |
| 5,697,671 | 12/1997 | Shavitz . |
| 5,711,573 | 1/1998 | Daniels .......................... 297/284.6 X |
| 5,713,629 | 2/1998 | Plackis . |
| 5,738,406 | 4/1998 | Deus ....................................... 297/200 |
| 5,743,979 | 4/1998 | Lorbiecki . |
| 5,797,155 | 8/1998 | Maier et al. .................... 297/452.41 X |

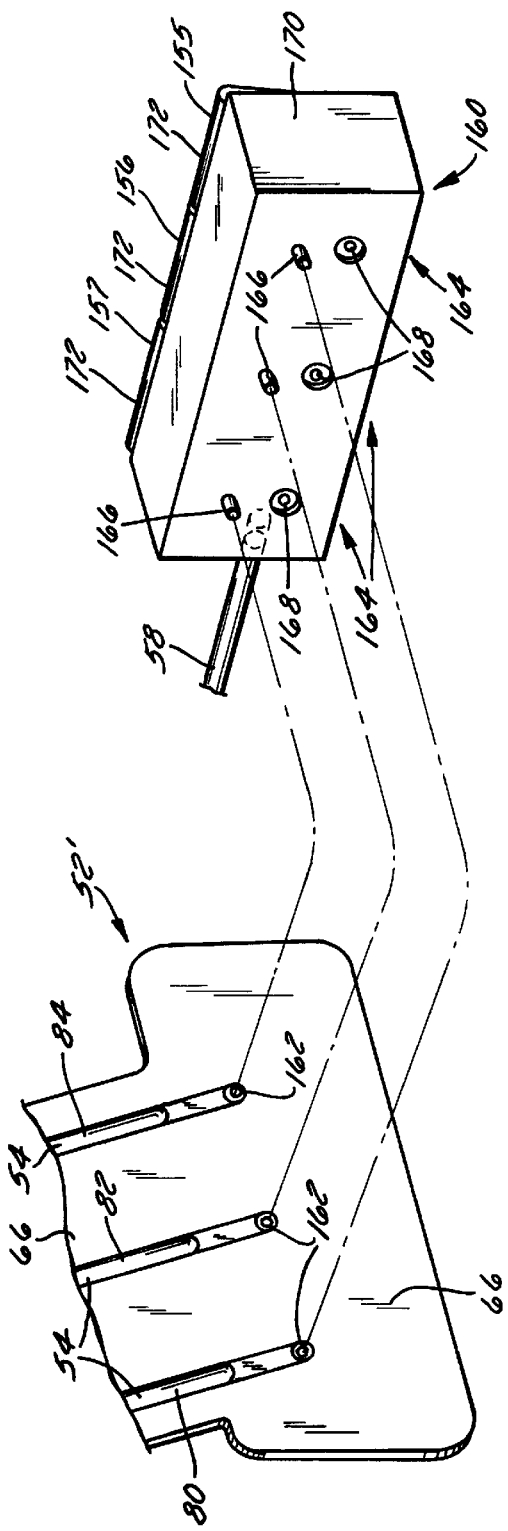
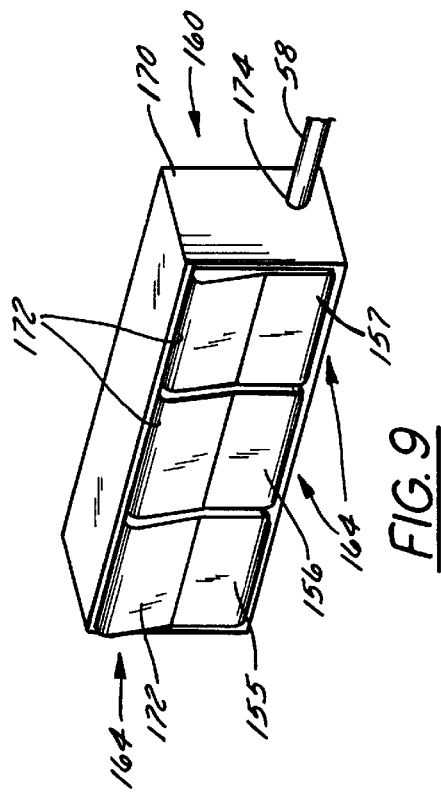
FIG. 8
FIG. 9

VEHICLE SEAT WITH INFLATABLE BLADDER

This application is a continuation of U.S. application Ser. No. 08/587,111, filed Jan. 11, 1996, which issued on Aug. 19, 1997 as U.S. Pat. No. 5,658,050.

FIELD OF THE INVENTION

This invention relates generally to vehicle seating which utilizes inflatable bladders to improve comfort while preventing fatigue and more particularly to a vehicle seat having an inflatable bladder of one piece, unitary construction with multiple chambers in communication with an integral control flap for enabling easy construction of the bladder and simple assembly of the bladder to a seat.

BACKGROUND OF THE INVENTION

Often people spend a great deal of time seated each day, whether it be in an office chair, in a car, in a truck, or riding a motorcycle. Often, the seats have virtually no way of being adjusted so that they can be made more comfortable to a person sitting in the seat. As a result, seats with little or no adjustability can be very uncomfortable to sit in, particularly for long periods of time. Additionally, such seating can contribute to fatigue or can improperly support body parts of the person sitting in the seat, such as, for example, resulting in poor lumbar support to the lower back of the seat occupant, which can undesirably increase fatigue by making the body part sore or stiff. Moreover, lack of adjustability can result in a seat occupant being poorly positioned relative to another object, such as the steering wheel of an automobile or the handlebars of a motorcycle. Finally, since people come in many different shapes, sizes, and weights, a seat lacking adequate adjustability may not properly fit a particular type or size of person, also making it very uncomfortable for that person to remain seated for long periods of time without experiencing discomfort or fatigue.

In light of all of these difficulties, seating designers have attempted to design seats which are adjustable in many different ways to improve comfort, decrease fatigue, properly position the seat occupant, and comfortably fit people of a wide variety of sizes, shapes and weights. However, seat design can be very complicated, particularly for vehicle seating designers. For example, it is known by vehicle seat designers that comfort to a seat occupant can be extremely important to the safety of the seat occupant. Therefore, vehicle seat designers attempt to design seats such that occupants having different body dimensions do not suffer driving fatigue, which can be detrimental to safety.

There are other factors that a seat designer must contend with as well. For example, it is desirable that a vehicle seat provide proper support to individual body areas by controlling how the pressure of the seat against a seat occupant is distributed. Additionally, it is preferred that a seat provide adequate lateral support to a seat occupant when the vehicle is turning while enabling the occupant to relatively freely adjust their sitting position without needing to readjust the seat.

Moreover, the components responsible for enabling seat adjustment must not adversely affect the vibrational and damping characteristics of the seat by preventing the natural frequency of the seat from falling within a range of excitation frequencies that are likely to be encountered during operation. Therefore, the distribution of the spring rates in the areas of the seat cushion and backrest where the adjustable components are located, as well as the overall spring rate and dampening capacity of the seat, must not be adversely affected by the use and operation of the adjustable components. Finally, all of the components which enable seat adjustability must be conveniently packaged within the seat while also not undesirably affecting the appearance of the seat.

To enhance seat occupant comfort, overlays or cushions have been developed that have one or more inflatable chambers. One such seat overlay, in the form of a seat cushion, is disclosed in Wilson, U.S. Pat. No. 3,540,776. These overlays are typically placed over a seat and inflated before the seat occupant sits down to enhance the comfort of the seat occupant. Unfortunately, these overlays are not specifically designed to maximize comfort for a specific seat contour but rather are designed to be used with any type of seat. As a result, these overlays can be more effective at preventing discomfort and fatigue when used with some types of seats and not with other types of seats.

Moreover, these overlay cushions are not particularly well suited for use in automotive vehicles because they can slip and slide around making them difficult to properly position for maximum comfort and because they can be easily damaged during use. Additionally, these overlays typically must be manually inflated and will leak over time, undesirably requiring periodic and time consuming manual reinflation.

Finally, the amount of cushioning provided by such an overlay is also limited because each chamber typically has a generally rounded "pillow" shaped construction which limits the inflated volume of the chamber thereby also limiting how deeply each chamber can be compressed during cushioning a seat occupant during use and operation of the overlay. To achieve greater cushioning, the surface area of a "pillow" shaped inflatable chamber can be increased to enable it to expand outwardly a greater distance when fully inflated. Unfortunately, such a larger, "pillow" shaped inflatable chamber requires a greater volume of air to inflate, which can be time consuming. Additionally, a "pillow" shaped chamber may not always uniformly apply pressure to the desired body part of the seat occupant thereby possibly reducing the amount of comfort that can be achieved.

The use of an air bladder having such a "pillow" inflatable chamber construction is less desirable for use with motorcycle seats because their seats are smaller, reducing the amount of cushioning that a "pillow" shaped inflatable chamber can provide because of the limited surface area available on the motorcycle seat limiting its maximum inflatable volume. Finally, it is virtually impossible to produce an inflatable overlay or bladder with individual inflatable chambers having the "pillow" construction because of the limited surface area reducing the surface area available for each chamber limiting the maximum cushioning available for a multi-chamber motorcycle seat overlay or built in inflatable bladder.

In other instances, inflatable bladders that are built into the seat have been used to provide adjustment to increase comfort and reduce fatigue. Examples of such built-in bladders are found in Flajole, U.S. Pat. No. 2,938,570, Isono et al., U.S. Pat. No. 4,592,588, and Ishida, et al., U.S. Pat. No. 4,807,931. These types of bladders cannot be easily manually inflated and typically require some source of air, such as from a hand bulb pump or another type of pressurized air supply, to inflate the bladder. For bladders which have more than one inflatable chamber, rather elaborate and complicated valving and air distribution arrangements have been developed, the assembly and installation of which are not cost effective particularly in light of the competitive economic climate that exists today in the automotive and off-road vehicle industries.

For example, Isono, et al., U.S. Pat. No. 4,592,588 discloses a vehicle seat having separate independently inflatable bladders received in compartments within the seat and underneath the seat cover. Unfortunately, each bladder is of separate and independent construction from every other bladder and requires separate insertion of each bladder into its compartment during assembly undesirably increasing the number of assembly steps as well as the cost to assemble a vehicle seat of the disclosed construction. Moreover, as a result of each bladder being independent of every other bladder, conduit or piping must be attached to each bladder and manually routed to an air supply which can even further undesirably increase assembly costs.

SUMMARY OF THE INVENTION

A vehicle seat having an inflatable bladder of one piece, unitary construction and possessing multiple inflatable chambers for enabling a seat occupant to separately and selectively inflate different chambers of the bladder to tune the firmness of various portions of the seat to the individual preference of the seat occupant for providing cushioning and comfort while also preferably preventing fatigue. To facilitate construction of the bladder and its assembly to a seat, the bladder also preferably has an integral control flap with valving that enables the chambers of the bladder to be selectively inflated and deflated.

To provide gas on demand to inflate one or more chambers of the bladder, the inflatable bladder receives gas from a gas supply that is comprised of a gas pump received in a gas reservoir. To enable gas to be virtually instantaneously supplied to the bladder without immediately requiring the pump to operate, the reservoir is charged by the pump with gas having a pressure that preferably is greater than the pressure of gas within the bladder. To ensure that gas is available upon demand, the supply preferably also includes a pressure switch in communication with the pump for sensing pressure in the reservoir and energizing the pump when the pressure in the reservoir drops too low.

The bladder of this invention is preferably constructed of a blank of a flexible and resilient material, such as preferably a urethane, that can be formed and molded having a gas tight seal that defines gas passages and inflatable chambers of the bladder along with an integral control flap. A preferred embodiment of a bladder of this invention has two pairs of inflatable chambers, with the chambers constructed and arranged such that a first pair of chambers preferably provides adjustable cushioning support to the femur and ischium skeletal structure of a seat occupant and a second pair of chambers preferably provides adjustable cushioning support to the tuberosity of ischium and ramus of ischium skeletal structure of the seat occupant. The first pair of inflatable chambers preferably also supports the biceps and gluteus maximus of the muscle structure of the seat occupant and the second pair of inflatable chambers preferably also supports the gluteus maximus.

In addition to the aforementioned bladder chambers, another preferred embodiment of a bladder of this invention has a third pair of chambers for providing adjustable cushioning support to the lumbar region of the seat occupant by supporting the posterior crest of ilium and sacral vertebra of the skeletal structure. The third pair of inflatable chambers also provides support to the erector spinae and gluteus maximus muscles of the muscle structure of the seat occupant.

During use of the bladder, as the first bladder chambers are inflated, it increases pressure on the femur and biceps of the seat occupant and decreases pressure on the ischium and gluteus maximus of the seat occupant. As the second set of chambers is inflated, pressure is increased on the tuberosity of ischium and gluteus maximus and pressure on the ramus of ischium is reduced. As the third set of chambers is inflated, pressure on the erector spinae and posterior crest of ilium is increased, while pressure on the gluteus maximus and sacral vertebra is reduced.

To enable gas to flow to and from the bladder chambers, the control flap has gas passages in communication with each pair of chambers to enable gas to be admitted into the chambers to inflate them and to allow gas to be exhausted from the chambers to deflate them. To enable each pair of chambers to communicate gas between each other, the bladder also preferably has a gas passage between each pair of chambers. If it is desired to control the shape of a chamber during inflation, as well as its shape and behavior under load, an inflatable chamber can have one or more relief indentions or recesses.

To enable gas to be selectively introduced by a seat occupant into a specific chamber or chambers of the bladder, the control flap preferably has accommodations for valving. In a preferred control flap embodiment, the control flap has an inlet port that communicates gas from the supply to a manifold which, in turn, has supply passages leading to each pair of inflatable chambers. The control flap preferably also has outlet passages in communication with the supply passages for enabling gas to be exhausted from the inflatable chambers. Preferably, gas exhausted from a chamber is relieved through exhaust ports in the outlet passages.

In a preferred control flap embodiment, the control flap and bladder are constructed of a pair of urethane sheets secured together by one or more seals defining inflatable chambers and gas passages within the bladder and control flap. The control flap has openings in its gas passageways leading to each inflatable chamber exposed by pulling apart the sheets. With the sheets urged apart, the nipples of a pneumatic valve assembly can be inserted into the openings of each gas passageway of the control flap. When the sheets are released, the sheets contract around the nipples to form a gas tight control flap and valve assembly.

Preferably, the gas used to inflate the bladder is air. Alternatively, the gas could be carbon dioxide, nitrogen, helium, or another gas that is preferably compressible. Alternatively, a fluid could also be used to inflate one or more chambers of the bladder.

In a preferred bladder embodiment, pinch valves are used to enable a seat occupant to selectively inflate or deflate chambers of the bladder. Each pinch valve is comprised of a generally T-shaped valve body having a valve stem that extends through an opening in the control flap adjacent the supply and outlet passages of an inflatable chamber. The valve body also has outwardly extending legs which are preferably oriented such that they can be made to bear against one or both passages for retaining gas in the chamber, admitting gas into the chamber to controllably inflate it, or exhausting gas from the chamber to deflate it. The valve body is preferably urged toward its gas retaining position by a spring located between the control flap and a cap fixtured to the free end of the valve stem.

To facilitate pivoting of the valve body between a gas admitting position, to inflate the chamber, and a gas exhausting position, to deflate the chamber, there preferably is a cover panel or bezel that is preferably located between the control flap and biasing spring. To facilitate assembly, the cover panel can be sewn to a sidewall portion of a covering of the seat, thereby also helping to locate and anchor the control flap.

Preferably, each leg of the valve body has an upraised boss that bears against a gas passage of the control flap when biased by the spring against the passage causing the passage to be pinched closed. Preferably, the construction and arrangement of the spring, cover panel, and valve body enables each leg to be biased against a gas passage of the control flap with enough force to pinch off and gas tightly seal the passage thereby preventing gas flow through the passage.

To further facilitate operation of the valve, the cover panel preferably has valve seats adjacent each gas passage of the control flap to help seat the boss of each valve leg against the passage, at least when the valve is in its gas retaining position. Preferably, each valve seat is a recess, indention, or hole in the cover panel which overlies a gas passage of the control flap and which is substantially complementary with the shape of that portion of the valve leg which pinches closed the passage, at least when the valve is in the gas retaining position.

In operation of a pinch valve, the valve can be moved between a gas admitting position, enabling inflation of a chamber, a gas exhausting position, enabling deflation of the chamber, and a gas retaining position, for retaining gas already received in the chamber. To inflate a chamber, the valve is preferably manually urged by the seat occupant toward its gas admitting position where the valve body pivots such that one of its legs maintains pinching pressure against the outlet passage of the control flap while the other leg moves away from the supply passage, thereby opening the supply passage and allowing gas from the gas supply to flow through the passage into the chamber. To deflate the chamber, the valve is preferably manually urged toward its gas exhausting position where the valve body is pivoted such that one of its legs maintains pinching pressure against the supply passage while its other leg moves away from the outlet passage, thereby permitting gas to flow from the chamber through the outlet passage and out its exhaust port When released by the seat occupant, the spring preferably returns the valve body to the gas retaining position with one of its legs pinching closed the supply passage and the other of its legs pinching closed the outlet passage.

The gas supply has a reservoir that preferably is a bag that is preferably gas tightly sealed for storing a charge of gas inside the bag for enabling one or more chambers of the bladder to be inflated on demand by the seat occupant. To enable the bag to be charged with gas, the pump is received inside the bag and has an inlet in communication with a gas source, such as preferably the outside atmosphere, and an outlet in communication with a supply line that is connected to the inlet port of the control flap. Preferably, the pump is a compressor able to fill the reservoir bag with enough gas such that the pressure of gas within the bag is greater than the pressure of gas within the bladder, at least while the valving of the bladder is in the gas retaining position.

To enable the compressor to charge and recharge the reservoir bag with a sufficient amount of pressurized gas, the pressure switch is connected to the compressor and senses the gas pressure within the bag. The pressure switch preferably energizes the compressor when pressure within the bag has dropped below a desired threshold pressure, $P_1$, to cause the compressor to recharge the bag with gas. The pressure switch preferably shuts off the compressor when pressure within the bag has risen to at least a desired upper threshold pressure, $P_2$.

Therefore, the pressure switch causes the compressor to recharge the reservoir bag with gas when the pressure in the bag drops below the lower threshold pressure, $P_1$, and energizes the compressor until the pressure within the bag reaches the upper threshold pressure, $P_2$. For example, the operating characteristics of the pressure switch preferably can be chosen such that $P_1$ is about 13 pounds per square inch (psi) and $P_2$ is about 18 psi to sufficiently charge the bag with gas such that the compressor need not immediately have to energize upon a valve of the bladder being moved to its gas admitting position until the pressure within the bag drops below 13 psi. Alternatively, a vacuum switch received inside the reservoir bag could also be used to control operation of the gas compressor in the same manner.

A preferred bag embodiment is constructed of two sheets of urethane with a seal about its periphery defining its sidewalls and joining the sheets together. One end of the bag has breaks in the seal for an inlet to provide an opening for an inlet to the gas compressor, an opening for the gas supply line leading to the bladder, a gas tight conduit for electrical wiring for both the compressor and switch, and a reference port conduit, if necessary, for the reference port of a vacuum or pressure switch. If a vacuum switch is used to control compressor operation, it is preferably received in the reservoir bag and has a reference port in communication with the atmosphere outside the bag for providing a reference pressure to the switch. To control compressor operation, the switch is wired to a power source in series with the compressor.

In constructing the bladder, a formable and moldable blank is preferably preheated, formed, and molded. Preferably, the blank is constructed of a pair of sheets that are preheated before being formed by vacuum forming. During vacuum forming and while each sheet preferably is still hot, a vacuum mold imparts to each sheet a desired three dimensional contour such that chambers, gas passages, and a control flap are formed. After vacuum forming, the two sheets are joined or bonded together forming a gas tight seal, further defining the chambers and gas passages of the bladder and gas passages of the control flap. Preferably, the sheets are formed such that at least a portion of the sidewall of each inflatable chamber of the bladder is generally perpendicular to the plane of the seal or an exterior wall of the chamber for maximizing the inflatable volume of the chamber relative to the surface area of its top wall.

After molding and once sufficiently cool, the bladder is assembled to a vehicle seat by placing it into retainer pockets in a foam support cushion of the seat before further assembling a seat covering over the bladder and foam cushion.

Objects, features and advantages of this invention are to provide a seat having an inflatable bladder which enables seat comfort to be easily and selectively adjusted by a seat occupant until a desired level or combination of firmness and comfort is achieved; provides separately and variably adjustable inflatable cushioning support to desired portions of the body of a seat occupant for enabling comfort to be tailored to seat occupants of different shapes, sizes and weights; can be used with seats of irregular shape and relatively small size; is well suited for use in a motorcycle seat; is versatile in that it can be used in automotive and off road vehicle seating; can be constructed from a single blank of material, yet results in a bladder of one piece, unitary construction having multiple inflatable chambers facilitating quick and easy seat assembly thereby minimizing assembly steps required to construct the seat; has inflatable chambers with generally perpendicular sidewalls for maximizing the inflatable volume of each chamber relative to the surface area of the chamber; is constructed with generally perpendicular chamber sidewalls for maximizing the downward displacement that each inflatable chamber is capable of undergoing when absorbing a load on the chamber; can be made using a vacuum forming and molding process that is relatively simple and economical and which produces a seal of good integrity defining chambers and gas passages in the bladder; has a control flap that is integral with the bladder for economical manufacture and simple seat assembly; utilizes a gas supply that can instantaneously provide gas to the bladder without having to wait for its pump or compressor to supply gas; utilizes a method of providing a supply of gas for inflating the bladder that makes available gas to inflate the bladder without having to wait for the pump or compressor to begin operation to supply the gas; utilizes a pinch valve of simple and economical construction for use in regulating gas flow into and out of each bladder chamber; is a bladder of rugged and durable construction, is easy to manufacture and assemble, is of simple design, economical manufacture, and is easy to use.

BRIEF DESCRIPTION OF THE DRAWINGS

These and other objects, features, and advantages of this invention will become apparent from the following detailed description of the best mode, appended claims, and accompanying drawings in which:

FIG. 8 is an enlarged fragmentary cross sectional view of another preferred embodiment of the control flap showing connection nipples of the flap for attachment to connection nipples of pneumatic valving for enabling the bladder to be selectively and controllably inflated and deflated;

FIG. 9 is a front view of the pneumatic valving;

FIG. 20 is a perspective view of a vehicle seat depicting in phantom a preferred embodiment of the bladder of this invention assembled into a backrest of the seat and another preferred embodiment of the bladder of this invention assembled into a cushion of the seat.

DETAILED DESCRIPTION OF THE INVENTION

Figure 1:
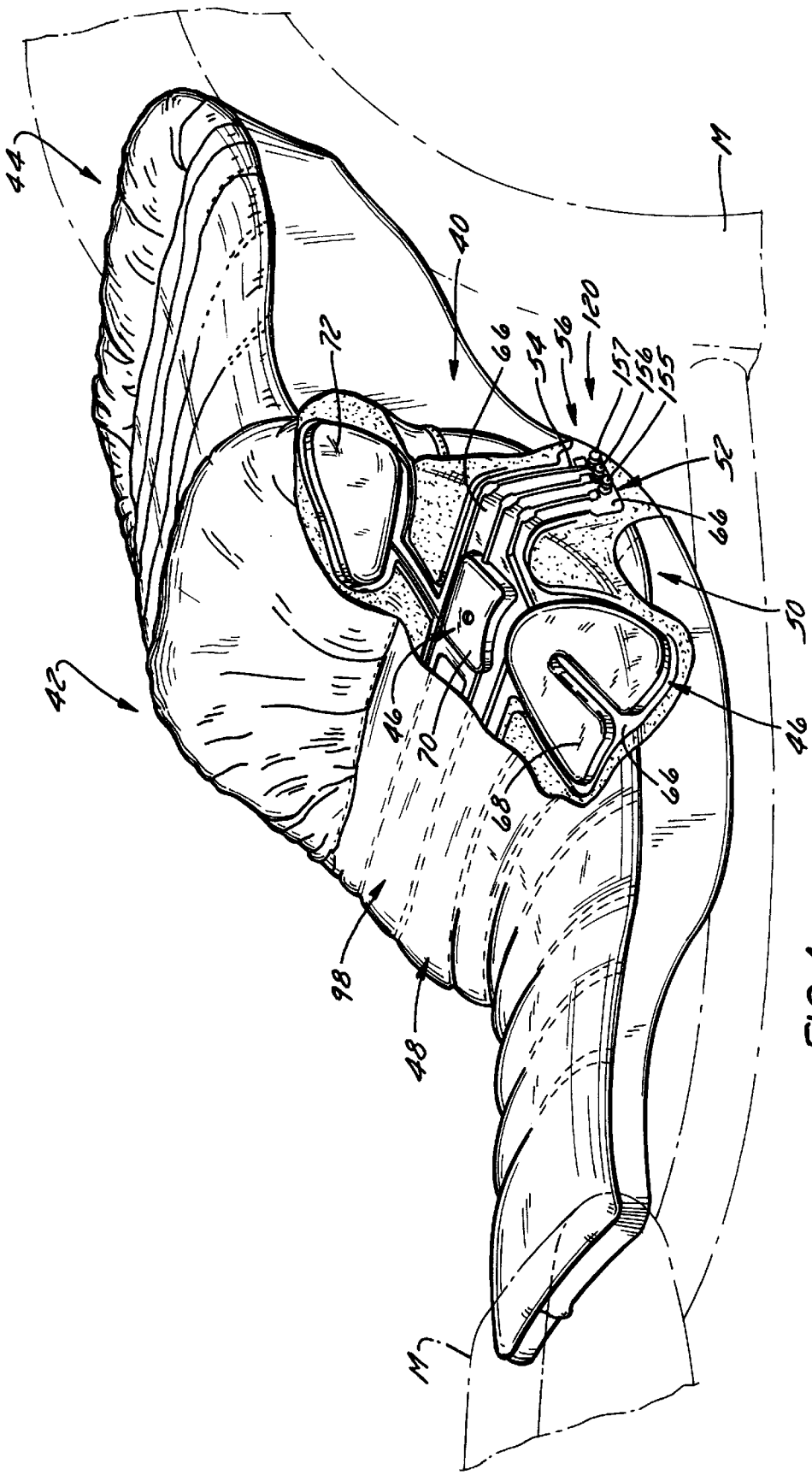
FIG. 1 is a perspective view of a vehicle seat with its seat cover cutaway to expose an inflatable bladder of this invention.

FIG. 1 illustrates an inflatable bladder 40 of this invention for a vehicle seat 42, such as a motorcycle seat 44, that has chambers 46 which can be selectively and variably inflated by a seat occupant to achieve a desired level of comfort while riding in or operating a vehicle, such as a motorcycle, M. As is shown in FIG. 1, the vehicle seat 42 has a seat cushion 48 that carries the bladder 40 and a sidewall portion 50 that receives and preferably carries an integral control flap 52 of the bladder 40 that is conveniently positioned for enabling the chambers 46 of the bladder 40 to be selectively inflated by a seat occupant during operation. Preferably, the bladder 40 has gas passages 54 leading from the control flap 52 to the chambers 46 for enabling a gas, such as preferably air, to be admitted into one or more of the chambers 46 to inflate them and also for enabling gas to be exhausted from one or more of the chambers 46 to deflate them. To enable gas to be controllably admitted and exhausted from the bladder 40 to control the amount of inflation of each chamber or set of chambers, the control flap 52 has one or more valves 56. To facilitate assembly to a vehicle seat, the chambers 46, control flap 52, and gas passages 54 makeup a bladder 40 of preferably one-piece, unitary construction for facilitating quick and simple assembly to a seat.

I. Inflatable Bladder System

Figure 2:
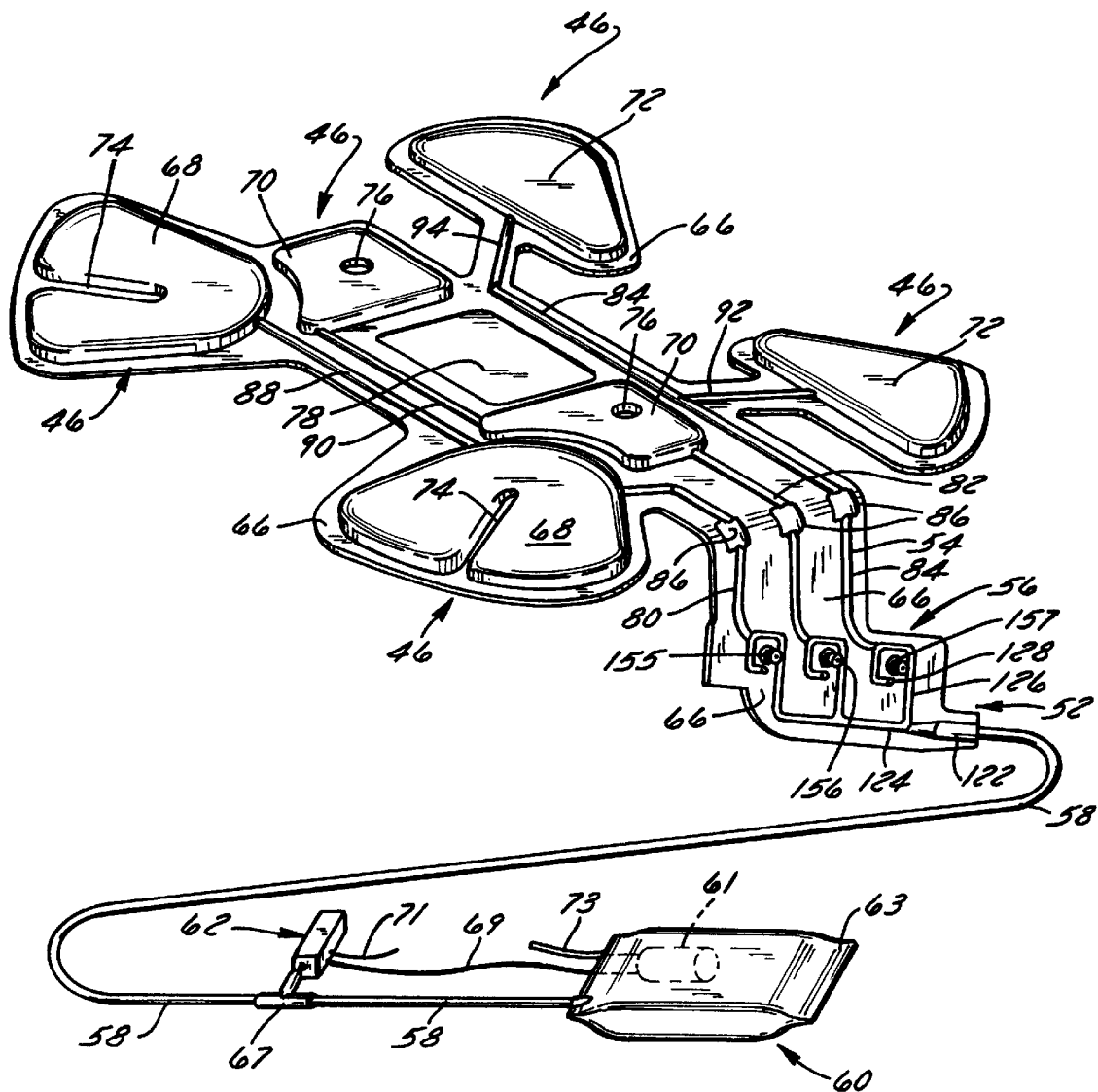
FIG. 2 is a perspective view of the bladder and a gas supply having a reservoir and pump for providing gas to inflate the bladder and a pressure switch for controlling operation of the pump.
Figure 3:
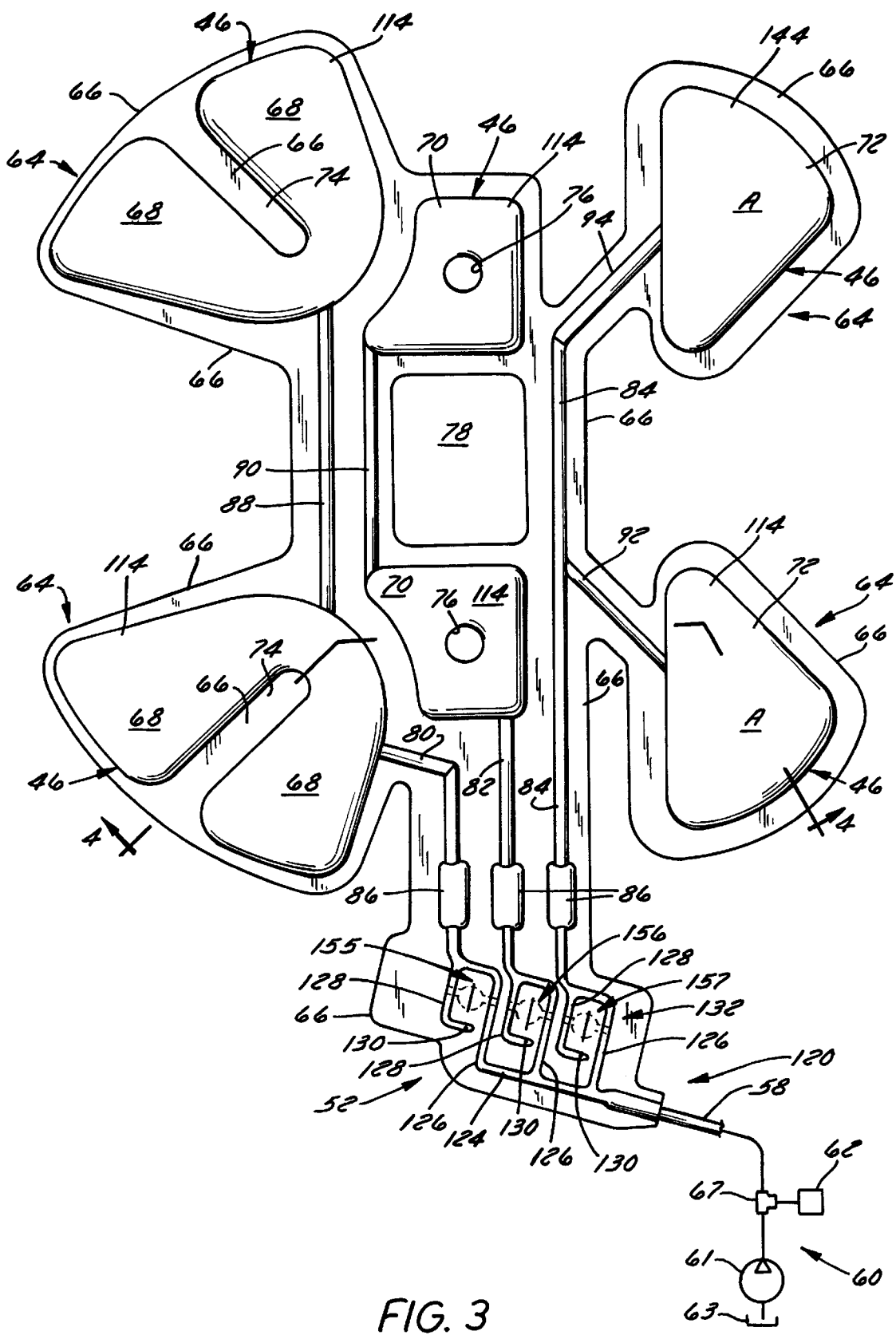
FIG. 3 is a top view of the bladder of FIG. 2 showing more clearly its control flap for controlling air flow into and out of inflatable chambers of the bladder and depicting schematically the construction and arrangement of the air supply and pressure switch.
Figure 4:
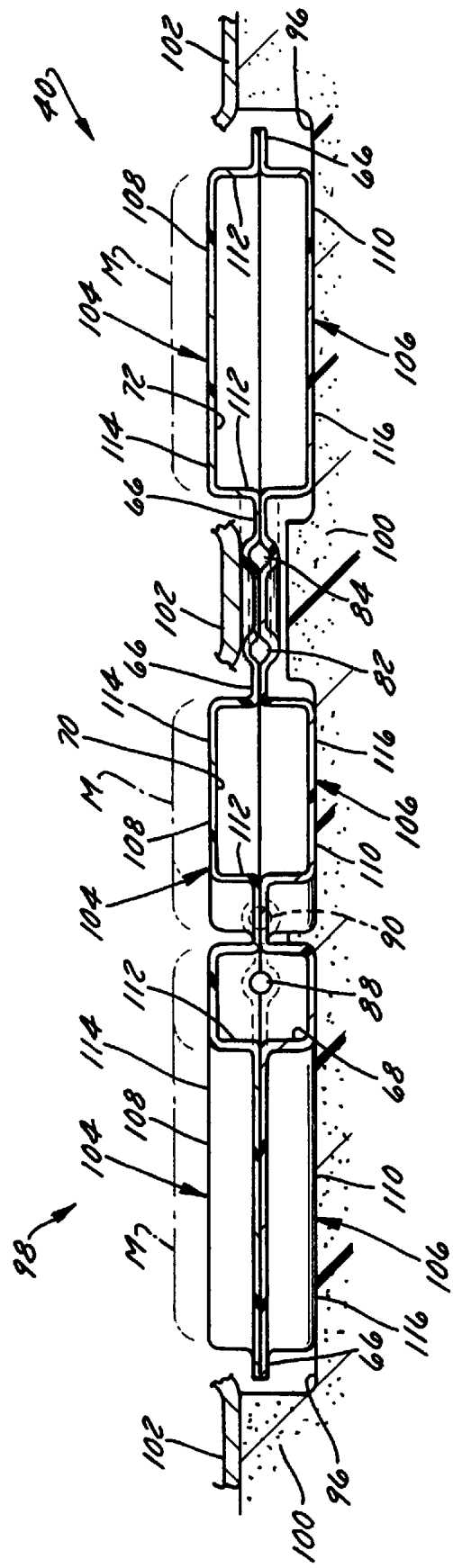
FIG. 4 is a cross sectional view of the bladder taken along line 4—4 of FIG. 3 shown with the covering of the seat broken away for clarity and the bladder carried by a foam support cushion of the seat.

FIGS. 2–4 further illustrate a preferred embodiment of the inflatable bladder 40 of this invention. Preferably, the bladder 40 is coupled by a supply line 58 to a gas supply 60 for providing gas under pressure to one or more inflatable chambers 46 of the bladder 40 to inflate the desired chamber or chambers 46. To ensure that the gas supply 60 has a sufficient amount of gas to adequately supply gas to the bladder 40 during use and operation, the gas supply 60 preferably communicates with a pressure sensing switch 62 that can be a pressure switch or a vacuum switch that is upstream of the control flap 52.

A. Inflatable Bladder

Referring in more detail to FIG. 3, the bladder 40 is constructed of a blank 64 of a material that can be formed and/or molded to maintain a seal of good integrity and which is a material that is preferably flexible to enable the chambers of the blank to be easily inflated and deflated while allowing the bladder chambers to resiliently deflect under load. For defining inflatable chambers 46 and passages in the bladder 40, the blank 64 has a seal 66. To enhance the comfort of a seat occupant, P (FIG. 18), one preferred embodiment of the bladder 40 of this invention has (a) a first pair of inflatable chambers 68 that are underneath the thighs of the occupant when seated, and (b) a second pair 70 of inflatable chambers that underlie the buttocks of the seat occupant when seated Preferably, the bladder 40 can be constructed with another pair of inflatable chambers 72 that supports the both sides of the lower back or lumbar region of a seat occupant when seated. Alternatively, the bladder 40 can be constructed without the third set of inflatable chambers 72, if desired.

1. Thigh Chambers

Preferably, the first set of inflatable chambers 68 are suitably spaced apart such that they generally underlie the legs of a seat occupant adjacent the upper thigh region of the seat occupant. Preferably, to help control the behavior of each chamber 68 during inflation and while under load to prevent collapse and undesirable deformation or bulging of each chamber 68, each chamber 68 has a recessed relief peninsula 74 which extends inwardly and which preferably partially divides each chamber. Preferably, the relief peninsula 74 is an indention in both sheets of the bladder 40 that are sealed together. Preferably, the seal 66 extends inwardly into each chamber 68 for creating the relief peninsula 74 of each chamber.

Preferably, the first set of inflatable chambers 68 are constructed and arranged to provide cushioning support to the femur and ischium bones of the skeletal structure of a seat occupant while also providing cushioning support to the biceps and gluteus maximus muscles of the seat occupant. During use of the bladder 40, as the first set of chambers 68 are inflated, they increase pressure to the femur and biceps while decreasing pressure to the gluteus maximus and ischium. Conversely, as each chamber 68 is deflated, pressure to the gluteus maximum and ischium is preferably increased while pressure to the femur and biceps is preferably decreased.

2. Buttocks Chambers

Preferably, the second set of inflatable chambers 70 are suitably spaced apart such that the chambers 70 provides support to the buttocks of a seat occupant. As is shown in FIGS. 3 & 4, each chamber 70 can have a relief indention 76, such as preferably for controlling the behavior of each chamber 70 during inflation and while under load to prevent bulging, collapse and undesirable deformation of each chamber 70. Preferably, the relief indentation 76 of each buttocks chamber 70 is constructed and arranged in a manner very similar to the relief peninsula 74 of each thigh chamber 68. If desired, each and every chamber of the bladder 40 may be constructed with such a relief indention or relief peninsula for helping to control the behavior of each chamber during loading to help control bulging, collapse and deformation of each chamber.

As is also depicted in FIG. 3, there can be a generally square shaped web 78 of material joining the second set of chambers 70, if desired. If desired, the web 78 of material can be removed or the bladder 40 can be constructed without the web of material between the second set of chambers 70.

Preferably, the second set of inflatable chambers 70 are constructed and arranged to provide cushioning support to the tuberosity of ischium and ramus of ischium of the skeletal structure of a seat occupant while also providing cushioning support to the gluteus maximus of the muscle structure of the seat occupant. During use of the bladder 40, as the second set of chambers 70 are inflated, the chambers 70 increase pressure to the tuberosity of ischium and gluteus maximus while decreasing pressure to the ramus of ischium. Conversely, as the chambers 70 are deflated, each chamber 70 preferably increases pressure to the ramus of ischium while decreasing pressure to the tuberosity of ischium and gluteus maximus.

3. Lumbar Chambers

Preferably, the third set of inflatable chambers 72 are spaced apart so that the chambers 72 are positioned adjacent the lumbar region of each side of the lower back of a seat occupant. Preferably, the third set of inflatable chambers 72 are constructed and arranged to provide support to the posterior crest of ilium and sacral vertebra of the skeletal structure of a seat occupant while also providing support to the erector spinae and gluteus maximus muscles of the seat occupant. During use of the bladder 40, as the third set of chambers 72 is inflated, pressure upon the posterior crest of ilium and erector spinae of the seat occupant is increased while pressure on the sacral vertebra and gluteus maximus is decreased. Conversely, as each chamber 72 of the third set is deflated, pressure on the sacral vertebra and gluteus maximus is preferably increased while pressure on the posterior crest of ilium and erector spinae is preferably decreased.

4. Bladder Construction

To enable the first set of inflatable chambers 68 to be inflated and deflated, the blank 64 has a gas passage 80 that extends from one of the chambers 68 to the control flap 52. Likewise, to enable the second seat of inflatable chambers 70 to be inflated and deflated, the blank 64 has a second gas passage 82 that extends from one of the chambers 70 to the control flap 52. Additionally, the blank 64 also has a gas passage 84 that extends from the control flap 52 to one of the inflatable chambers of the third set of inflatable chambers 72 to enable at least one of the chambers of the third set 72 to be inflated and deflated. Preferably, each gas passage 80, 82, and 84, has a flattened portion 86 for permitting each passage to be bent, such as is shown in FIGS. 1 & 2, without obstructing gas flow through each passage.

Preferably, each chamber of each set of inflatable chambers can communicate gas to and from the other chamber of that same set of chambers. As such, each chamber of the first set of chambers 68 can preferably communicate gas to the other chamber of the first set 68 through a connecting passage 88 that is also preferably defined by seal 66. To enable the second set of chambers 70 to communicate gas between each other, the seal 66 also preferably defines another connecting passage 90. Preferably, the third set of chambers 72 can communicate gas between each other as a result of passage 84 having a first branch 92 extending to one of the chambers and a second branch 94 extending to the other of the chambers.

FIG. 4 illustrates the bladder 40 carried by a seat occupant supporting surface 98 of the seat 44 that preferably, is a foam support cushion 100 that makes up part of a seat cushion or a backrest of a seat. As is depicted in FIG. 4, the bladder 40 is preferably received in a retainer pocket 96 in a foam support cushion 100 of the seat and has a seat covering 102 which overlies both the cushion 100 and the bladder 40.

As is also shown in FIG. 4, the bladder 40 is constructed of a blank 64 of material that preferably has a top layer 104 that is formed and joined to a bottom layer 106 forming a bladder 40 that is preferably of one-piece, unitary construction to facilitate seat assembly. Preferably, the seal 66 extends about the periphery of the top and bottom layers 104 & 106 and about the periphery of each inflatable chamber and gas passage to help define each inflatable chamber and passage. As is shown more clearly in FIG. 3, the control flap 52 is preferably also integrally a part of the blank 64 such that the control flap 52 and bladder 40 are of one-piece and unitary construction to facilitate seat assembly. Preferably, the top and bottom layers 104 & 106 also form force receiving and cushioning surfaces 114 & 116 for each of the inflatable chambers 68, 70 & 72, in the region of each of the inflatable chambers 68, 70 & 72.

The blank 64 can be vacuum formed to construct the bladder 40 of this invention. If vacuum formed, the blank 64 is preferably constructed of a first sheet 108 that is formed and joined to a formed second sheet 110 by the seal 66 forming a bladder 40 that is of one-piece, unitary construction. If vacuum formed, the first sheet 108 preferably forms one of the force receiving and cushioning surfaces 114 or 116 and the second sheet 110 forms the other of the force receiving and cushioning surfaces 114 or 116. For example, as is shown in FIG. 4, the first sheet 108 forms the top surface 104 of the bladder 40 and the second sheet 110 forms the bottom surface 106 of the bladder 40.

As is shown in FIGS. 3 & 4, representative of preferably each and every inflatable chamber of a bladder 40 of this invention, inflatable chamber 72 has force receiving and cushioning surfaces 114 & 116 of surface area, A (FIG. 3), and a sidewall 112 (FIG. 4) about its periphery that adjoins the force receiving and cushioning surfaces 114 & 116 of the chamber 72. Preferably, when no load is applied to an at least partially inflated chamber 72, such as is depicted in FIG. 4, each sidewall 112 has a portion that (a) is generally perpendicular to at least one of the supporting surfaces 114 or 116, (b) is generally perpendicular to at least one of the layers 104 or 106 of the blank 40 in the region between inflatable chambers of the bladder 40, or (c) is generally perpendicular to a plane between the sheets 108 & 110 of the blank 64 in the chamber region defined by the seal 66 for maximizing the inflated volume of each inflatable chamber relative to the surface area of one of its force receiving and cushioning surfaces 114 or 116.

By maximizing the inflated volume of a chamber relative to the surface area of its force receiving and cushioning surfaces 114 or 116, each inflatable chamber 68, 70 & 72 can advantageously be smaller in surface area while providing at least the same and preferably greater cushioning ability as opposed to a chamber of conventional "pillow" construction having a greater surface area. More particularly, this enables each inflatable chamber of a bladder 40 of this invention to be able to deflect inwardly a greater distance before its top force receiving and cushioning surface 114 bottoms against its bottom force receiving and cushioning surface 116 because the top and bottom walls of each chamber are spaced further apart. As such, the bladder 40 of this invention is also particularly well suited for vehicle seating that has a smaller seat occupant supporting surface, such as for example, a motorcycle seat 44. Moreover, the cushioning ability of the foam support cushion 100 of the seat combined with inflatable chambers 68, 70 & 72, result in a seat that provides a high degree of comfort to an occupant of the seat. Additionally, this inflatable chamber construction is also advantageous because it allows for a greater range of seat occupant adjustment because its maximum inflated volume is greater relative to its surface area.

As is also depicted in phantom in FIG. 4, during operation of the bladder 40, the top surface 114 of each chamber 68, 70 & 72 can preferably be expanded outwardly toward a maximum limit, M, to provide support and cushioning to a seat occupant. Preferably, this maximum limit of expansion, M, can be influenced by factors such as the gas pressure within the inflatable chamber, seat occupant weight, the maximum amount of stretch of the bladder material, vehicle seat loading conditions, as well as other factors. Although the maximum limit of expansion, M, shown for each inflatable chamber 68, 70 & 72 depicted in FIG. 4 is approximately the same, the maximum limits of expansion for some individual inflatable chambers can differ relative to other inflatable chambers.

Alternatively, the blank 64 can be blow molded to form the bladder 40 of this invention. If blow molded, the blank 64 is preferably of one-piece and at least partially tubular construction and is received in a mold having a three dimensional contour that is preferably complementary to the desired final formed shape of each surface of the bladder 40. If desired, an extrusion blow molding process may be used to construct the bladder 40 of this invention. If a blow molding process is used, the resultant bladder may lack an outwardly extending seal about its periphery, such as the outwardly extending seal shown in FIG. 4. Preferably, it will have a seal 66 between chambers and gas passages of the bladder 40 for defining the inflatable chambers and passages.

B. Integral Control Flap and Valve Assembly

1. First Control Flap Embodiment

FIGS. 5 through 7B illustrate a preferred embodiment of a control flap and valve assembly 120 for enabling each inflatable chamber 68, 70 & 72 to be selectively inflated or deflated. Preferably, the control flap 52 has an inlet port 122 for preferably gas tightly receiving the gas supply line 58 to enable gas to be admitted from the gas supply 60 (FIG. 2) into one or more of the inflatable chambers 68, 70 & 72 of the bladder 40. The inlet port 122 preferably communicates gas to an inlet passage 123 and, thereafter, a manifold passage 124 in the control flap 52 for enabling gas to be distributed to each of the chambers 68, 70 & 72. Branching off from the manifold 124 are individual gas supply passages 126 leading to the gas passages 80, 82 & 84 of the inflatable chambers 68, 70, & 72 for communicating gas to each of the chambers when the appropriate valve is opened. To enable gas to be exhausted from an inflatable chamber to deflate the chamber, each gas passage 126 preferably also can communicate with an outlet passage 128. Preferably, each outlet passage 128 has an exhaust port 130, in the form of a slit or an opening, that enables gas to be exhausted from a chamber to the atmosphere during deflation of that chamber.

2. Pinch Valve Assembly

FIGS. 5 through 7B also illustrate in detail three pinch valve assemblies 132, each of which cooperate with the control flap 52 to enable a seat occupant to (a) selectively admit gas into one or more of the inflatable chambers 68, 70 & 72 to inflate the desired chamber, (b) selectively exhaust gas from one or more of the chambers 68, 70 & 72 to deflate the desired chamber, or (c) retain gas in one or more of the inflatable chambers 68, 70 & 72 to maintain a desired amount of gas in one or more of the chambers 68, 70 & 72 to achieve a desired level of support or cushioning for the seat occupant. Preferably, the assembly 120 has a valve 155 for controlling gas flow to and from the thigh chambers 68, a valve 156 for controlling gas flow to and from the buttocks chambers 70, and another valve 157 for controlling gas flow to and from the lumbar chambers 72.

Figure 6:
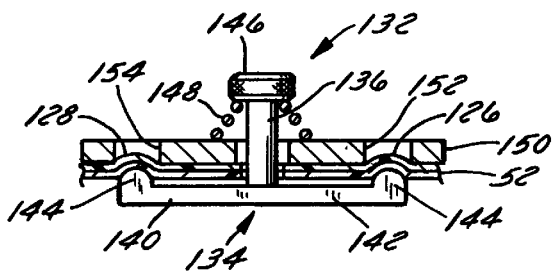
FIG. 6 is an enlarged fragmentary cross sectional view of the control flap showing the pinch valve in its gas retaining position pinching closed both a supply passage and an outlet passage of the control flap.
Figure 7A:
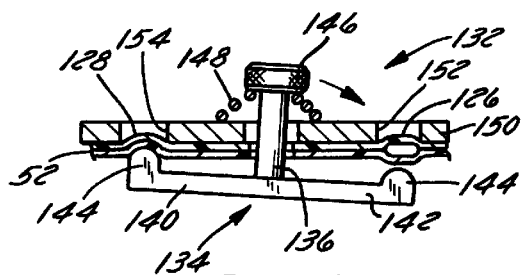
FIG. 7A is an enlarged fragmentary cross sectional view of the control flap showing the pinch valve in a gas admitting position pinching the closed the outlet passage while allowing gas flow through the supply passage to inflate a chamber of the bladder.
Figure 7B:
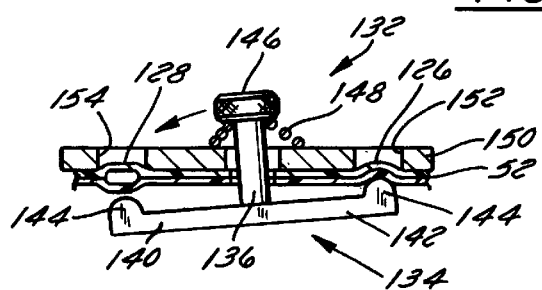
FIG. 7B is an enlarged fragmentary cross sectional view of the control flap showing the pinch valve in a gas exhausting position pinching closed the supply passage while allowing gas flow through the outlet passage to deflate a chamber of the bladder.

As is shown in FIG. 6, each pinch valve 132 can be placed in a gas retaining position, where both the supply passage 126 and outlet passage 128 leading to a particular inflatable chamber of the bladder 40 are pinched preferably closed to retain gas within that chamber. Additionally, as is shown in FIG. 7A, each valve 132 can also be urged to a gas admitting position where the supply passage 126 is opened and the outlet passage 128 is pinched closed permitting gas from the supply 60 to inflate the desired chamber. Finally, as is shown in FIG. 7B, each valve 132 can be urged to a gas exhausting position where the outlet passage 128 is opened and the supply passage 126 is pinched closed for deflating the chamber by exhausting gas from the chamber out the exhaust port. Preferably, each valve 132 is biased to a gas retaining position and must be manually urged by a seat occupant to either the gas admitting position or the gas exhausting position.

Figure 5:
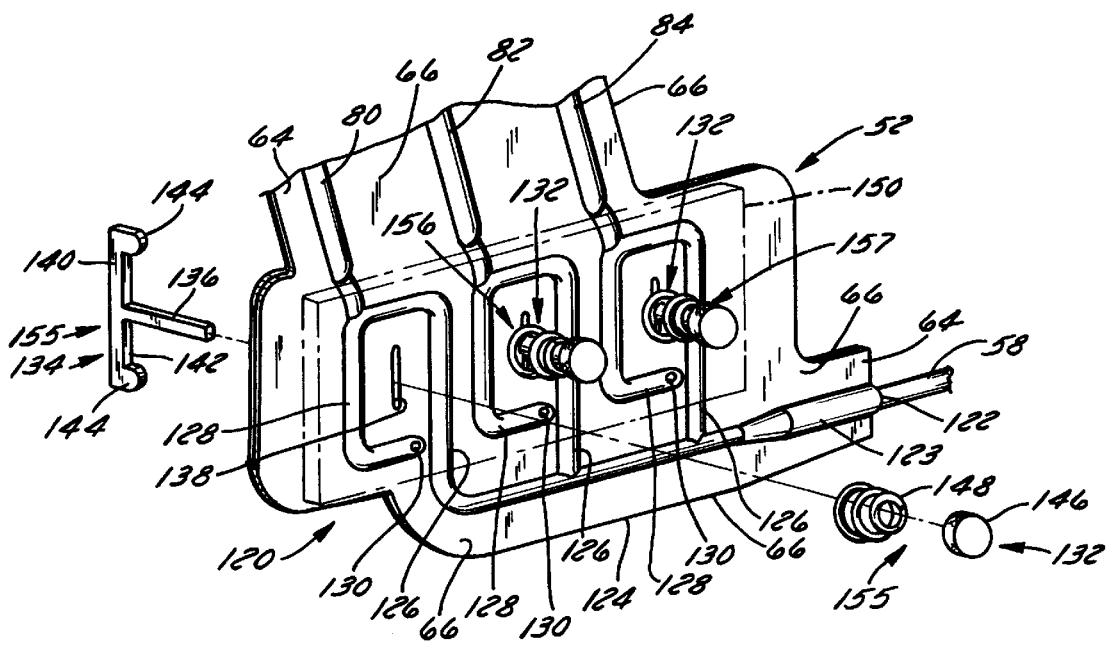
FIG. 5 is an enlarged fragmentary view of a preferred embodiment of the control flap showing in more detail the construction and arrangement of pinch valves for controlling air flow into and out of inflatable chambers of the bladder.

As is shown more clearly in FIG. 5, the valve assembly 132 has a valve body 134 that is preferably generally T-shaped. The valve body 134 has a stem 136 that is preferably received through an opening or slit 138 in the control flap 52 adjacent the gas supply passage 126 and outlet passage 128 of an inflatable chamber. Preferably, the stem 136 is of generally square or generally rectangular cross section to facilitate its insertion through the control flap mounting slit 138. Alternatively, the valve stem 136 could also be of generally round cross section, such as if it is desired to have an end of the stem 136 to be threaded to receive a threaded valve cap or button.

At one end of the stem 136 are a pair of outwardly extending legs 140 & 142 which bear against control flap gas passages 126 and 128 when the valve 132 is in the gas retaining position, such as is shown in FIG. 6. To facilitate pinching of a gas passage, the end of each leg 140 & 142 of the valve body 134 preferably has an outwardly protruding boss 144 that bears directly against the gas passage when the valve 132 is pinching the passage closed.

Preferably, the valve body 134 is constructed of a metal, such as preferably steel, aluminum, titanium, copper, a stainless steel, magnesium, an alloy of one of these metals, or another suitable metal. Alternatively, the valve 134 body could be constructed of a plastic, a composite, another polymeric material or a synthetic material. For example, the valve body 134 could also be constructed of a nylon, glass filled nylon, a carbon fiber composite, LEXAN, polycarbonate, a thermoplastic material, or even a thermosettable plastic, such as bakelite.

At the other end of the stem 136, the valve 132 has a cap 146 received on the end of the valve stem 136, preferably also for helping to retain the valve 132 when its stem 136 is inserted through the control flap slit 138 thereby mounting it to the control flap 52. Preferably, the cap 146 is pressed onto the end of the valve stem 136. If desired, the cap 146 could also be welded or adhesively fastened to the valve stem 136. Alternatively, if desired, the cap 146 could be threaded onto a threaded end of the stem 136 for securing the cap 146 to the valve 132. Additionally, although a cap 146 of generally round construction is depicted in FIGS. 5 through 7B, the cap 146 could be of square or generally rectangular construction, if desired.

To urge the legs 140 & 142 of the valve body 134 against the gas passages 126 & 128 when the valve 132 is in the gas retaining position (FIG. 6), the valve 132 has a spring 148. Preferably the spring 148 is located on the stem 136 of the valve 132 between the cap 146 and control flap 52 for urging or biasing the valve 132 toward its gas retaining position. Preferably, the spring 148 urges the valve 132 toward its gas retaining position for returning the valve 132 to the gas retaining position when the seat occupant has released the valve 132 and also for retaining the valve 132 in the gas retaining position when the seat occupant is not engaging the valve 132. Preferably, the spring 148 is a coil spring having a spring constant or spring rate sufficiently large so as to draw the valve 132 against the desired gas passage of the control flap 52 with enough force to pinch the passage closed such that a gas tight seal in that passage is preferably created at the pinch point.

To shield the control flap 52 from the environment and provide support to each valve 132 to enable each valve 132 to be pivoted between its gas retaining (FIG. 6), gas admitting (FIG. 7A), and gas exhausting (FIG. 7B) positions, there preferably is a bezel or cover panel 150 (shown in phantom in FIG. 5) between the outer surface of the control flap 52 and the valve spring 148. Preferably, the control flap cover panel 150 is constructed of a resilient and relatively stiff material such as a metal, a plastic, or wood for enabling it to provide good support to each valve 132 during use and operation of the valve 132. Preferably, the panel 150 can be a bezel that is sewn directly to the seat covering 102 of the seat 42 for positioning and anchoring the control flap 52 of the bladder 40 when seat assembly is completed.

To facilitate the pinching of each gas passage of the control flap 52 and to assist in properly locating each valve leg 140 & 142 relative to the desired gas passage, the control flap cover panel 150 preferably has a valve seat 152 overlying the supply passage 126 and another valve seat 154 overlying the exhaust passage 128. Preferably, each valve seat 152 & 154 is a through opening in the cover panel 150. Alternatively, each valve seat 152 & 154 could simply be an indention, recess, or pocket in the underside of the panel 150 to enable each valve 132 to better seal the gas passage it is pinching against. Preferably, the periphery of each valve seat opening 152 & 154 is substantially complementary with the shape of the boss 144 on each valve leg to help maximize sealing of the gas passage. For example, each valve seat opening 152 & 154 or indention could have a square, round, or preferably generally rectangular shape for facilitating sealing of the passage when the boss 144 of a valve leg bears against a gas passage, such as when the valve 132 is in the gas retaining position depicted in FIG. 6.

In use and operation of a valve 132 shown in FIGS. 5 through 7B, when not engaged by a seat occupant, the valve 132 preferably remains in the gas retaining position shown in FIG. 6, pinching both the supply passage 126 and outlet passage 128 closed thereby causing gas already inside the inflatable chamber of the bladder 40 associated with that valve 132 to remain in that chamber. As is also illustrated in FIG. 6, when the valve 132 is in the gas retaining position, the boss 144 of each valve leg 140 & 142 bears against gas passages 126 & 128 and preferably seats in valve seat openings 152 & 154.

If it is desired for gas to be admitted into a gas chamber to inflate the chamber, such as chambers 68, 70 or 72, the valve 132 of the desired set of inflatable chambers is pivoted clockwise, such as is depicted by the direction indicating arrow in FIG. 7A, causing its valve leg 140 to continue pinching the outlet passage 128 closed while moving its other valve leg 142 away from the supply passage 126, opening the passage 126, and thereby permitting gas flow through the passage 126.

If it is desired to deflate a chamber, the desired valve 132 can be pivoted in a counterclockwise direction, such as is depicted by the arrow in FIG. 7B, to cause its valve leg 142 to pinch the supply passage 126 while moving its other leg 140 away from the outlet passage 128, thereby permitting gas to flow through the passage 128 and out the exhaust port 130. When released, the valve 132 preferably returns to its gas retaining position and remains in the gas retaining position until further engaged by an operator of the control flap 52 that typically will be the seat occupant.

3. Second Control Flap Embodiment and Pneumatic Valve Arrangement

FIG. 8 illustrates a second preferred embodiment of a control flap and valve assembly 120' for enabling each inflatable chamber 68, 70 & 72 of the bladder 40 to be selectively inflated or deflated. Preferably, the control flap 52' has a series of fittings or nipples that complementarily and airtightly mate with a series of fittings or nipples of a pneumatic valve assembly 160 to enable gas to be (a) retained in a chamber of the bladder 40, (b) admitted into the chamber, or (c) exhausted from the chamber.

As is shown in FIG. 8, the control flap 52' can be constructed and arranged such that there is a fitting or nipple 162 at the end of each gas passage 54, each for enabling connection to a single pneumatic valve or a pneumatic valve 164 of the multiple pneumatic valve assembly 160 (FIG. 9). To connect each valve 164 to a supply nipple 162, each valve 164 preferably has a complementary fitting or nipple 166 that sealingly mates with the supply nipple 162. As such, to enable gas to be admitted or exhausted from each chamber, gas passages 80, 82 & 84 each have fitting or nipple 162 for receiving the complementary fitting or nipple 166 of each valve 164. To enable gas to be exhausted to deflate a chamber, each valve 164 can be constructed with an exhaust port 168. To facilitate mounting of the valves 164 to the control flap 52', there may be a cover panel (not shown) between the control flap 52' and the valves 164.

Referring additionally to FIG. 9, each valve 164 can be of rocker-type construction having a housing 170 with a button 172 that can be pivoted in one direction to admit gas into a chamber 68, 70 or 72 of the bladder 40 and in another direction to exhaust gas from a chamber. Preferably, the button 172 of each valve is biased to a gas retaining position when released by a seat occupant or not engaged by a seat occupant, such as is depicted in FIG. 9. To admit gas from the gas supply 60, the valve assembly 160 has an inlet port 174 connected to the gas supply line 58.

Alternatively, the bladder control flap 52 or 52' could also be modified to accommodate a valve of the type disclosed in Folling, U.S. Pat. No. 3,652,126, to enable individual bladder chambers 68, 70 and/or 72 to be selectively and controllably inflated and deflated by a seat occupant. If such a valve is used, the control flap 52 or 52' can preferably be constructed with integral nipples for quick and easy connection of each such valve to the control flap.

4. Third Control Flap Embodiment and Pneumatic Valve Arrangement

Figure 10:
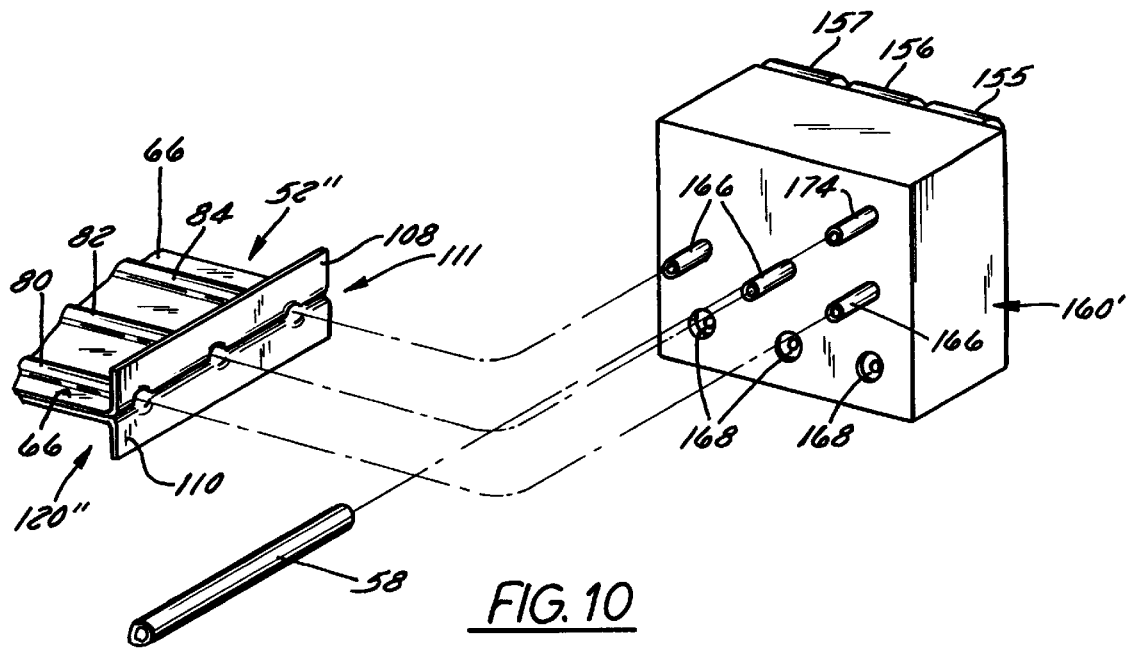
FIG. 10 is an enlarged fragmentary perspective view of another preferred embodiment of a control flap and valving assembly.
Figure 11:
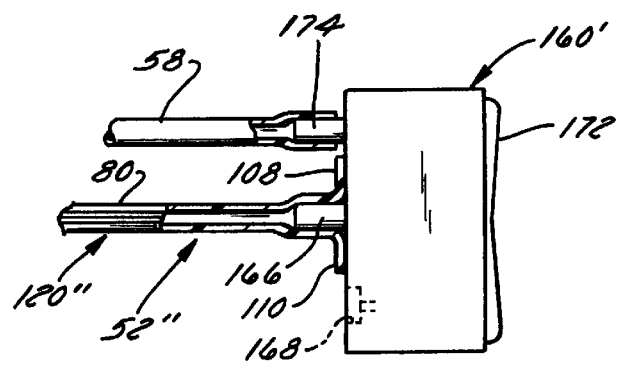
FIG. 11 is a side view of the control flap and valving assembly embodiment shown in FIG. 10 after assembly has been completed.

FIGS. 10 & 11 illustrate a third preferred embodiment of a control flap and valve assembly 120" for enabling each inflatable chamber 68, 70 & 72 of the bladder 40 to be selectively inflated or deflated. The control flap 52" extends from the bladder 40 and comprises a pair of urethane sheets 108 & 110 that have a split line 111 where the sheets 108 & 110 are separable from each other for exposing gas passages 80, 82, & 84 to receive a pneumatic valve assembly 160'.

In assembly, the control flap sheets 108 & 110 are urged apart to expose openings to gas passages 80, 82 & 84 so that the nipples 166 of the valve assembly 160' can be inserted into the gas passage openings. After the nipples 166 of the valve assembly 160' are inserted into the gas passage openings, the sheets 108 & 110 are released. Upon release, the sheets 108 & 110 tend to want to contract to their original position causing the sheets 108 & 110 in the area of the gas passage openings to contract around the valve nipples 166 to securely mount the valve assembly 160' to the control flap 52" in a gas tight fashion, as is depicted in FIG. 11.

C. Gas Supply

Referring to FIGS. 2 & 3, the gas supply 60 has a gas pump 61 (shown in FIG. 2 in phantom) for supplying gas under pressure to one or more inflatable chambers 68, 70 or 72 of the bladder 40 upon demand by a seat occupant. To provide a charge of pressurized gas to facilitate quickly inflating one or more chambers 68, 70 or 72 of the bladder 40, the gas pump 61 is preferably received in a reservoir 63. To cause the pump 61 to provide gas under pressure, the pump 61 is preferably in communication with pressure sensor 62 that is a switch capable of controlling pump operation.

Preferably, the gas pump 61 is a compressor that charges the reservoir 63 with gas from a gas source exterior of the reservoir 63 to enable gas to be provided on demand to inflate the bladder chambers. Preferably, the compressor 61 is an air compressor that transfers air from outside the reservoir 63 into the reservoir 63. To enable air to be drawn from outside the reservoir 63 and pumped into the reservoir 63, the compressor 61 preferably has an inlet 75 (FIG. 16A) that extends outside of the reservoir 63.

Preferably, the gas used to charge the reservoir 63 and inflate the bladder 40 is air. Alternatively, another gas could be used to charge the reservoir 63, such as for example, carbon dioxide, helium, or another suitable gas. Alternatively, a suitable fluid could also be used to inflate one or more chambers of the bladder 40.

Preferably, the compressor 61 is electrically powered by a suitable power source (not shown) such as a six or twelve volt vehicle power supply, an alternating current power supply, a direct current power supply, electricity from a generator or alternator of a vehicle, as well as a power supply that could be a battery or series of batteries capable of providing sufficient electrical energy to energize and power the compressor 61. For example, a battery such as a lithium ion, nickel hydride, lead acid, or another type of battery, that preferably is rechargeable, could be used to power the compressor 61, thereby also enabling the bladder 40 of this invention to be used for seating applications other than vehicle seating.

The reservoir 63 preferably is a sealed inflatable bag that has an outlet 65 connected to the gas supply line 58 for enabling the bag 63, when charged with gas under pressure, to instantly provide a supply of gas to inflate a chamber 46 of the bladder 40 when a valve 56 of the bladder 40 is moved to its gas admitting position. Preferably, the reservoir bag 63 holds a charge of pressurized gas sufficient to begin inflating one or more bladder chambers 46 when a valve 56 is moved to its gas admitting position without requiring the compressor 61 to operate, preferably until the gas pressure within the reservoir bag 63 drops below a predetermined threshold pressure level. Advantageously, this enables gas to be immediately supplied on demand to the bladder 40 without having to wait for the compressor 61 to energize and begin supplying gas to the bladder 40.

Preferably, the reservoir bag 63 is constructed of a synthetic, plastic, or polymeric material, such as preferably a urethane, and is preferably of gas tight construction to enable the bag 63 to retain a charge of gas at a pressure greater than ambient or atmospheric pressure substantially without experiencing a detrimental amount of leakage from the bag 63. Preferably, the bag 63 can be blow molded with an opening of sufficient size for enabling the compressor 61 to be placed inside the bag 63. If desired, the bag 63 can be constructed from a tubular blank that is gas tightly sealed at both ends. If desired, the bag 63 can be sealed by heat sealing, ultrasonically welding, using an adhesive or by another type of sealing process to create a seal that is preferably gas tight to permit the bag 63 to be pressurized during operation.

The reservoir bag 63 can hold a charge of gas at a pressure of at least twelve pounds per square inch. Preferably, the reservoir bag 63 is constructed to hold a charge of air at a pressure of at least about fifteen pounds per square inch to enable air from the bag 63 to be immediately supplied to the bladder 40 upon demand by a seat occupant.

Preferably, the pressure sensing switch 62 is in communication with the reservoir bag 63 to sense the pressure of the air within the bag 63. As is shown in FIG. 2, the pressure switch 62 can be connected by a generally T-shaped fitting 67 to the supply line 58, and is preferably located downstream of the reservoir bag 63 and upstream of the valves 56 of the control flap 52. If it is desired to eliminate the use of a T-shaped fitting 67, the pressure switch 62 can directly communicate with the gas in the reservoir bag 63, as is depicted in phantom in FIG. 16A, to sense pressure within the bag 63 as well as upstream of the valving and control flap 52. The pressure sensing switch 62 preferably essentially functions as an on-off switch for the compressor 61, activating the compressor 61 when pressure in the reservoir bag 63 has dropped below the predetermined threshold pressure level. To control operation of the compressor 61, the pressure switch 62 is connected to the compressor 61 by at least one electrical wire 69, such as is shown in FIG. 2. Another wire 71 is preferably connected to a power source (not shown). As is also depicted in FIG. 2, the compressor 61 has at least one electrical wire 73 also leading to the power source. Alternatively, a vacuum switch 77 (FIG. 16B) received inside the reservoir bag 63 could also be used to sense pressure within the reservoir bag 63 to control operation of the compressor 61.

Preferably, the threshold pressure, P, of the pressure switch 62 is about twelve pounds per square inch. Preferably, the switch 62 has a lower threshold pressure, $P_1$, and an upper threshold pressure, $P_2$, for determining when to energize the compressor 61 and for determining when to deenergize the compressor 61. Preferably, the lower threshold pressure, $P_1$, determines when the pressure switch 62 energizes the compressor 61 to recharge the reservoir 63 with additional air. Preferably, the upper threshold pressure, $P_2$, determines when to deenergize the compressor 61, preferably when the reservoir 63 has been fully recharged. For the motorcycle seat bladder 40 and gas supply 60 depicted in FIGS. 1 through 4, the lower threshold pressure, $P_1$, is preferably about twelve pounds per square inch to energize the compressor 61 and the upper threshold pressure, $P_2$, is preferably about eighteen pounds per square inch to deenergize the compressor 61.

Alternatively, if desired, the lower threshold pressure, $P_1$, could be less or more than twelve pounds per square inch and the upper threshold pressure, $P_2$, could be greater or more than eighteen pounds. For other seating applications and bladder configurations, routine research and experimentation may be required to determine an upper threshold pressure, $P_2$, or range of pressures and a lower threshold pressure, $P_1$, or range of pressures which facilitate operation of the gas supply 60 to enable it to supply a sufficient amount of gas to the bladder 40 on demand by a seat occupant. A vacuum switch 77 (FIG. 16B) can also be used in this manner to control compressor operation.

Figure 16B:
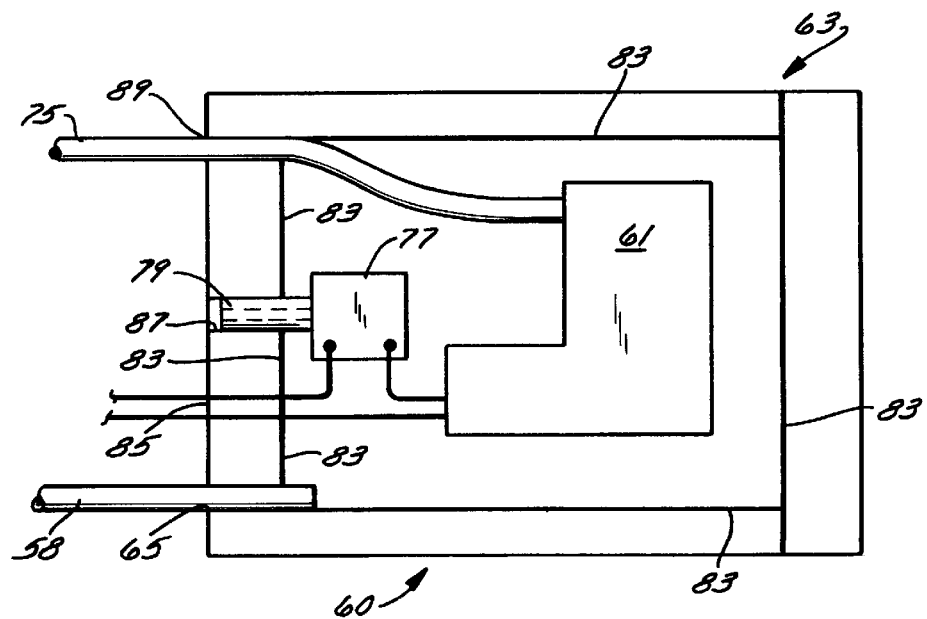
FIG. 16B is an enlarged top view of a preferred gas supply embodiment having a vacuum switch received inside the reservoir of the gas supply.

A preferred embodiment of a gas supply 60 and reservoir bag 63 is shown in FIG. 16B. The gas supply has a compressor 61 received inside the bag with an inlet line 75 extending into the bag 63 for enabling the compressor 61 to draw air from outside the bag 63 into the bag 63. Although not shown, the compressor 61 has a discharge within the bag 63 that enables the compressor 61 to expel outside air that has been pressurized by the compressor 61 into the bag 63.

To control operation of the compressor 61, a vacuum switch 77 is also received inside the bag 63 and is in electrical communication with the compressor 61 for sensing the pressure within the bag 63 and energizing or deenergizing the compressor 61 depending upon the sensed pressure. To provide a reference for the vacuum switch 77, the switch 77 has a reference port 79 that is in communication with the atmosphere outside the bag 63. Preferably, the reference port 79 is in communication with the ambient pressure for providing a pressure reference for operation of the switch 77.

To enable operation of the compressor, the switch 77 and compressor 61 are connected together by electrical wires. Preferably, a pair of wires from an electrical power source communicate both with the switch 77 and compressor 61. So that the switch 77 can control operation of the compressor 61, the switch 77 is preferably wired in series with the compressor 61.

A preferred construction of the reservoir bag 63 is also shown in FIG. 16B. The bag 63 is preferably constructed of two sheets 81 of urethane joined together by a seal 83 about its periphery to form a bag 63 that is gas tight and which can hold gas under pressure preferably without leaking. To connect the gas supply line 58 to the bag 63, there is a break in the seal 83 forming an outlet 65. Preferably, the size of the outlet opening 65 is slightly smaller than the gas supply line 58 to provide a gas tight friction fit between the line 58 and outlet 65. If desired, a sealant or an adhesive can be used to better provide a gas tight seal between the gas supply line 58 and the outlet 65 of the reservoir bag 63.

To enable electrical wiring to be introduced into the bag 63, the seal 83 has another break forming a conduit 85 for the wires. Preferably, the conduit 85 gas tightly seals around the wires for preventing leakage from the bag 63. If desired, a sealant or an adhesive can be used to better provide a gas tight seal between the wires and the conduit 85 of the reservoir bag 63.

To enable the reference port 79 of the switch 77 to communicate with the atmosphere outside of the bag 63, the seal 83 has a break forming a reference port conduit 87.

Preferably, the conduit 87 gas tightly seals around the reference port 79 of the switch 77 to prevent leakage from the bag 63.

To facilitate drawing gas into the reservoir bag 63, the seal 83 has another break that forms an inlet opening 89 for receiving therethrough the compressor inlet line 75. Preferably, the inlet 89 gas tightly seals around the compressor inlet line 75 to prevent leakage.

II. Method of Bladder Manufacture

Figure 12:
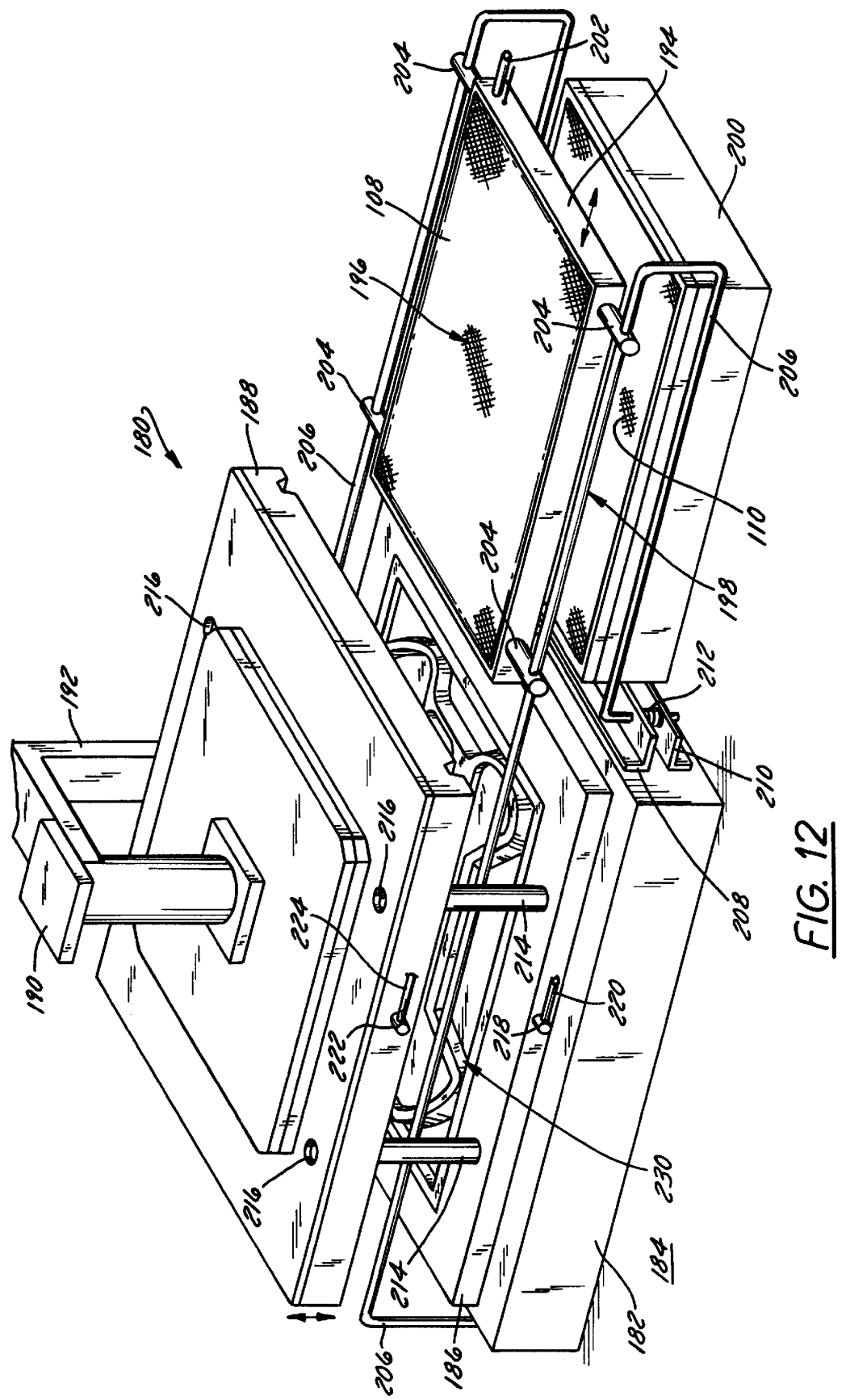
FIG. 12 illustrates a forming and molding apparatus having a pair of vacuum molds for constructing the bladder.
Figure 13:
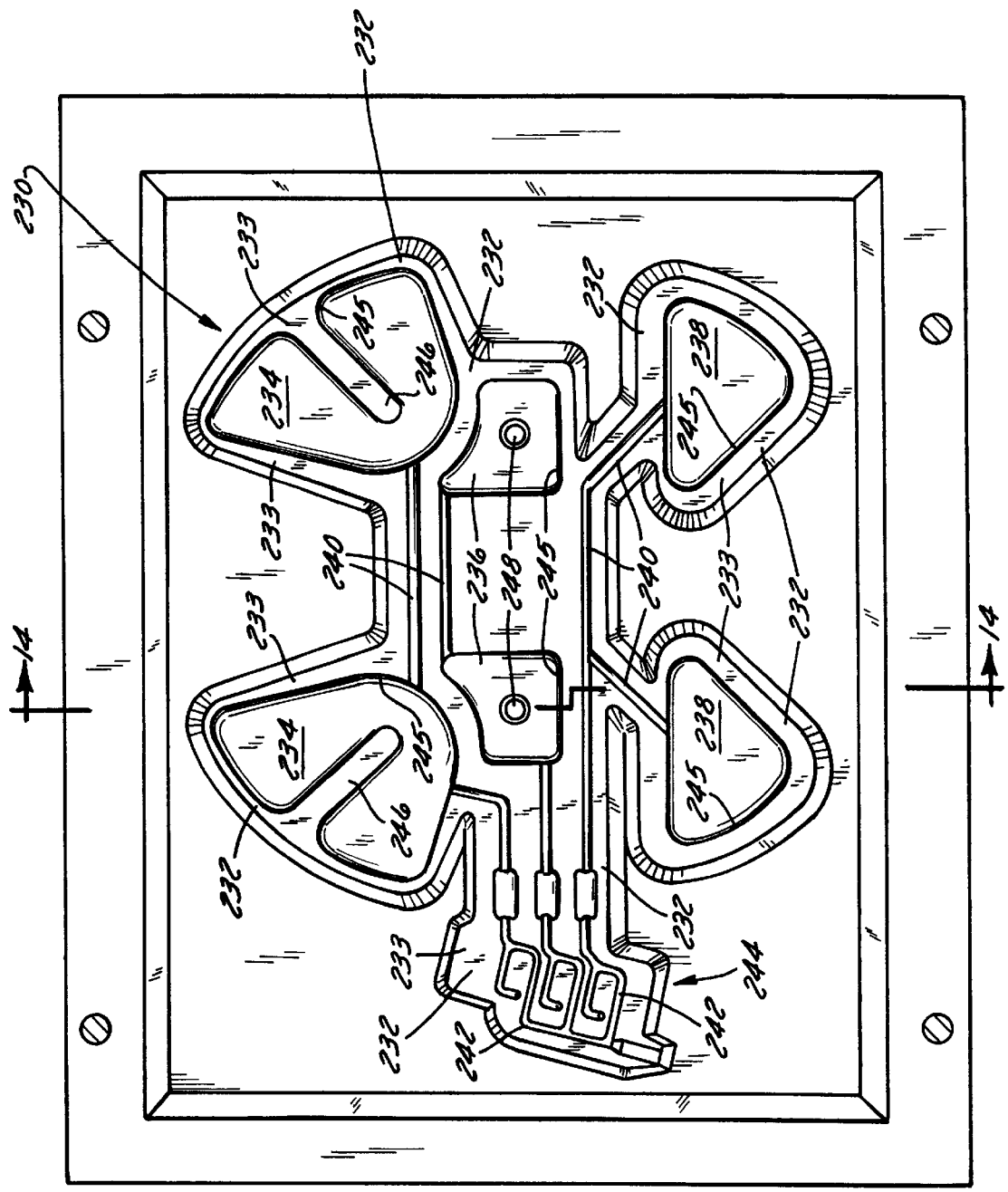
FIG. 13 shows a top view of a vacuum forming mold used to construct the bladder.
Figure 14:
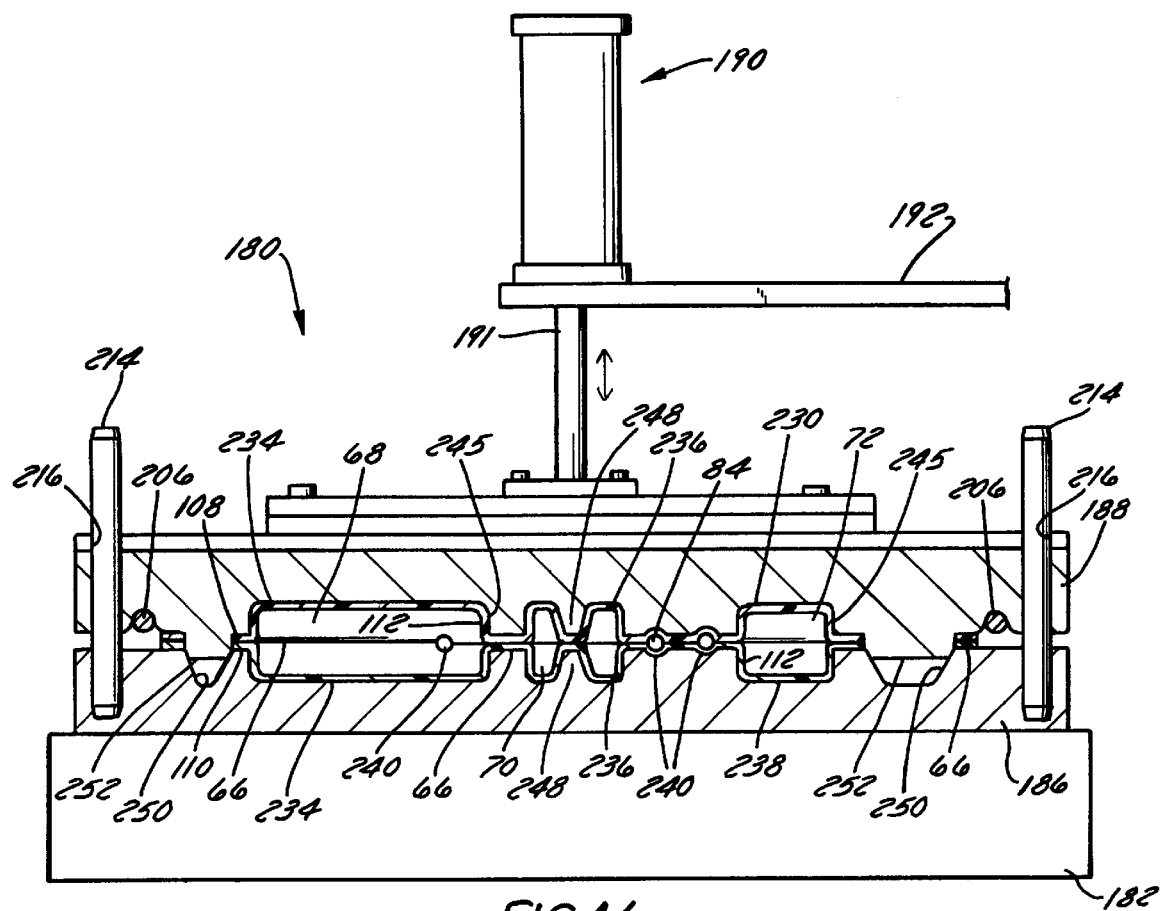
FIG. 14 illustrates the mold halves clamped together forming and molding the bladder.

FIGS. 12 through 14 illustrate a vacuum forming press 180 for depicting a method of making a bladder 40 of this invention. In practicing a method of making a bladder 40 of this invention, each sheet 108 & 110 is first preheated to make it more pliable for forming. After preheating, each sheet 108 & 110 is drawn against a three dimensionally contoured mold, preferably by application of a vacuum, to form the inflatable chambers and gas passages of the bladder 40. During the forming operation, the molds are brought together to form a seal 66 between the sheets 108 & 110, joining the sheets 108 & 110 together to form the bladder 40 while also defining the boundaries of each inflatable chamber and gas passage.

A. Apparatus for Preheating, Forming, and Molding

As is shown in FIG. 12, the vacuum forming press 180 has a base 182 which can rest on a floor or supporting surface 184 of a molding facility, manufacturing plant, or the like. To enable a bladder 40 to be vacuum formed, the press 180 has a lower female vacuum mold 186 carried by the base 182 and an upper female vacuum mold 188 secured to a press ram 190 that is carried by an arm 192 that is, in turn, supported by the base 182.

To preheat a sheet 108 or 110 of a blank 64 which is to form the bladder 40 after vacuum forming and molding takes place, the upper sheet 108 of the blank 64 is placed upon a preheating table 194. Preferably, the preheating table 194 has an upper heating surface 196 for preheating the top sheet 108 of the bladder blank 64 and a lower heating surface 198 for preheating a bottom sheet 110 of the blank 64, all in preparation for vacuum forming. Before preheating occurs, the lower sheet 110 of the blank 64 is preferably placed on a platter 200 that is preferably carried by the base 182 of the press 180 or which rests upon the ground 184.

To enable the bottom sheet 110 to be retained against the lower heating surface 198 of the preheating table 194, the table 194 preferably also is a vacuum table that is connected by a vacuum line 202 to a vacuum source (not shown), such as a vacuum pump, an eductor, an ejector, a venturi, or another device capable of producing a vacuum. Preferably, any vacuum created within the table 194 is also communicated to both the upper heating surface 196 and the lower heating surface 198 for drawing each sheet 108 & 110 of the blank 64 into tight intimate contact with a heating surface to maximize heat transfer from each heating surface to each sheet. Preferably, each heating surface 196 & 198 has a plurality of perforations or holes for enabling vacuum to be communicated from within the table 194 to each sheet 108 & 110, to retain each sheet 108 & 110 against a heating surface 196 or 198.

Preferably, each heating surface 196 & 198 is a contact heater for transferring heat from the heating surface to a sheet of the blank 64 primarily through contact between the sheet and heating surface. Preferably, each heating surface 196 & 198 is comprised of a plurality of strip heaters which are electrically heated to preheat the sheets 108 & 110 of the blank 64 for vacuum forming. Preferably, resistance or inductive heating is used to heat the strip heaters and the amount of heat generated by the strip heater can preferably be selectively controlled by an operator of the press 180 to selectively and controllably preheat each sheet 108 & 110 of the blank 64 to a temperature that facilitates vacuum forming. Preferably, each strip heater is a resistive strip heater constructed of copper or a copper alloy. Preferably, the amount of heat generated by the top heating surface 196 can be selectively independently controlled apart from the amount of heat generated by the bottom heating surface 198 to enable both sheets to be heated to approximately the same temperature before forming and to prevent overheating of the top sheet 108.

Preferably, the surface of each heating surface 196 & 198 that directly contacts a sheet 108 & 110 of the bladder blank 64 is coated with an anti-stick or friction reducing coating for preventing the sheet of the blank from adhering or sticking to the preheating table 194. Preferably, each surface 196 & 198 is coated with an anti-stick or friction reducing material, such as TEFLON, and which can be in the form of a tape, film, or powder, to prevent each sheet 108 & 110 from sticking to the table 194, particularly after being heated during preheating.

Preferably, heat generated by a heating surface 196 or 198 can be selectively adjusted and controlled such as by a variable resistor or another type of heating control. If desired, the heating surface can be in communication with one or more temperature sensors, such as one or more thermocouples, for enabling the temperature of a heating surface 196 and/or 198 or a sheet 108 and/or 110 of the blank 64 to be sensed. If desired, temperature information can be utilized by electronic circuitry to controllably heat each sheet 108 & 110 of the blank 64 to a desired temperature for vacuum forming and to maintain each sheet 108 & 110 at the desired temperature for a desired period of time, if necessary. Alternatively, if desired, a blank 64 for constructing a bladder 40 of this invention could be preheated by another type of contact heater or another method of heat transfer, such as, for example, a type of radiant or convective heating.

To enable the bottom sheet 110 to be transferred from the platter 200 to the lower heating surface 198 of the preheating table 194, the platter 200 preferably can be moved upwardly toward the lower heating surface 198. Preferably, a vacuum is applied to the lower heating surface 198 before or when transferring the sheet 110 to enable the sheet 110 to be picked up from the platter 200 and cause the sheet 110 to be retained against the lower heating surface 198. Alternatively, the preheating table 194 can be constructed and arranged so as to be movable downwardly toward the platter 200 to transfer the sheet 110 from the platter 200 to the lower heating surface 198.

To enable the sheets 108 & 110 to be transported to the vacuum molds 186 & 188, the preheating table 194 is mounted by guide arms 204 to rails 206 carried by the press base 182 enabling the table 194 to slide on the rails 206 toward the molds 186 & 188 until it is preferably positioned adjacent to and between the molds 186 & 188. Preferably, each rail 206 is mounted by angle irons 208 & 210 to the base 182 adjacent one end and by angle irons (not shown) carried by the base 182 adjacent the other end. So that the table 194 will "float" or simply be displaced downwardly when clamped between the vacuum molds 186 & 188 to facilitate press clamping of the table 194 between the molds 186 & 188, each end of each rail 206 is preferably carried by a spring 212 on one of the angle irons. To enable the table 194 to "float", the upper angle iron 208 may not need to be attached to the base 182 of the press 180.

To enable the upper mold 188 to be brought towards the lower mold 186 to clamp the table 194 between the molds 186 & 188 and thereafter to clamp the sheets 108 & 110 of the blank 64 between the molds 186 & 188, the press ram 190 preferably has a reciprocable piston (not shown) which can be extended downwardly to preferably move the upper mold 188 towards the lower mold 186. Preferably, the press ram 190 is a hydraulic or pneumatic cylinder that has a piston 191 which can be controllably extended to move the upper mold 188 relative to the lower mold 186. Alternatively, a press ram 190 could also be used to move the lower mold 186 towards the upper mold 188. In fact, a combination of upper and lower press rams could be used to bring the upper and lower molds toward each other, if desired.

To maintain accurate location of the lower mold 186 relative to the upper mold 188 when moving one of the molds relative to the other of the molds, such as during press operation, the press base 182 preferably has guide pins 214 that extend upwardly from the region of the lower mold 186 and which are received in complementary locator bores 216 in the upper mold 188. By maintaining accurate location of the upper mold 188 relative to the lower mold 186, and vice versa, during forming, it insures accurate placement of the seal 66 of the bladder 40 so that all of the chambers 68, 70 & 72 and gas passages of the bladder 40, and integral control flap 52, are properly formed, accurately located and well defined.

To further facilitate maintaining accurate location of the molds 186 & 188 relative to each other when they are clamped directly against each other, such as is shown in FIG. 14, one of the molds preferably has a notch 250 and the other of the molds preferably has an outwardly projecting locator 252 of complementary construction that engages the notch 250. When the locator 252 of one mold 188 is received in the locator notch 250 of the other mold 186, it preferably also clamps the sheets 108 & 110 about their periphery to create a vacuum seal about the periphery of the molds 186 & 188 to maintain a vacuum of good integrity during forming and molding.

To introduce a vacuum to the lower mold 186 during forming of the bottom sheet 110, the lower mold 186 has a vacuum fitting 218 connected to a vacuum hose 220 that is attached to a vacuum source (not shown). To introduce a vacuum to the upper mold 188 during forming of the top sheet 108, the upper mold 188 has a vacuum fitting 222 connected to a vacuum hose 224 that is also attached to a vacuum source (not shown). If desired, the vacuum source which provides a vacuum to the preheating table 194 may also be used as a vacuum source for one or both molds 186 & 188. Although the top sheet 108 of the bladder 40 has been heretofore depicted as being formed by the upper mold 188 and the bottom sheet 110 of the bladder 40 as being formed by the lower mold 186, it should be pointed out that the top sheet 108 of the bladder 40 could also be formed by the lower mold 186 and the bottom sheet 110 formed by the upper mold 188 since both molds 186 & 188 have substantially similar and preferably virtually identical three dimensional contours.

Referring to FIGS. 13 & 14, the lower mold 186 has a three dimensionally contoured surface 230 for forming and molding a sheet which is substantially similar and preferably virtually identical to the three dimensionally contoured surface 230 (FIG. 14) of the upper mold 188. As is shown more clearly in FIG. 13, the three dimensionally contoured molding surface 230 has an upraised wall 232 about its periphery that is preferably flattened to provide a land 233 for mating against a complementary land 233 of the other mold. This upraised wall 232 not only prevents vacuum leakage from inside the periphery defined by the wall 232 when the molds 186 & 188 are pressed against each other during forming of the bladder 40, it also preferably defines at least part of the seal 66 of the bladder 40 when forming and molding of the sheets 108 & 110 are completed.

For forming the inflatable chambers 68, 70 & 72 of the bladder 40 shown in FIG. 1, the molding surface 230 respectively has a first pair of recessed inflatable chamber forming cavities 234, a second pair of recessed chamber forming cavities 236, and a third pair of recessed chamber forming cavities 238. To form gas passages in the bladder, such as passages 80, 82, 84, 88, 90, 92 & 94, the molding surface 230 has recessed channels 240 of preferably generally semihemispherical cross section. Likewise, gas passages 124, 126 & 128 in the control flap 52 are formed by similarly contoured and recessed channels 242 in a control flap portion 244 of the molding surface 230.

Preferably, as is shown in FIGS. 13 & 14, each mold 186 & 188 has sidewalls 245 adjoining the recessed inflatable chamber forming cavities 234, 236 & 238 and the upraised wall portion 232, with the sidewalls 245 having a portion that is preferably substantially perpendicular to either (1) the exterior surface of the upraised wall 232 or (2) the sheet contacting surface of a recessed chamber forming cavity 234, 236, or 238, for forming sidewalls 112 of the bladder 40 that each have a portion generally perpendicular for maximizing the inflatable volume of each chamber 68, 70 & 72 relative to its surface area.

To provide the indented relief peninsula 74 in each thigh supporting chamber 68, the mold surface 230 has an upraised molding peninsula 246 extending inwardly into each recessed thigh chamber forming cavity 234. If it is desired for the seal 66 to coincide with each relief peninsula 76 of each thigh supporting chamber 68, the molding peninsula 246 of one mold 186 or 188 can mate with the molding peninsula 246 of the other mold 186 or 188 to cause the relief peninsula 74 of one sheet 108 or 110 to be joined or sealed to the relief peninsula 74 of the other sheet 108 or 110, for a given chamber 68. Likewise, to form the relief indentions 76 of the buttocks chambers 70, one or both molds can have an upwardly projecting protrusion 248. If it is desired that the relief indentions 76 of each pair of chamber top and bottom walls are to be sealed together, the protrusions 248 of one of the molds preferably extends sufficiently outwardly such that it mates against the protrusions 248 of the other of the molds during forming.

To draw each sheet against the three dimensionally contoured mold surface 230 during forming and molding, each mold preferably has a plurality of perforations or bores (not shown) in the mold 186 & 188 that communicate respectively with vacuum hoses 220 & 224 to enable a vacuum to be created within each mold 186 & 188. Preferably, the size, spacing and density of the vacuum communicating bores or perforations of each mold 186 & 188 are optimized to draw each sheet 108 & 110 of the bladder blank 64 into tight intimate contact with a molding surface 230 during forming and molding.

B. Preheating

Referring to FIG. 12, during preheating of the bladder blank 64, a vacuum is preferably applied to the preheating table 194 to draw the top sheet 108 against the upper heating surface 196 of the table 194. To cause the lower sheet 110 to be preheated, the platter 200 carrying the sheet 110 is preferably raised upwardly toward the lower heating surface 198 of the table 194 until the vacuum draws the sheet 110 against the lower heating surface 198 of the table 194. Preferably, the vacuum applied to the heating table 194 is sufficient to draw each sheet 108 & 110 into tight intimate contact with the heating surfaces 196 & 198 of the table 194. Preferably, a vacuum of at least eighteen inches of mercury is applied to the vacuum table 194 to suitably draw the sheets 108 & 110 against the heating surfaces 196 & 198.

Heat is applied to each sheet 108 & 110 until each sheet reaches a temperature that makes it suitably pliable for forming and molding. For example, for sheets 108 & 110 constructed of urethane having a thickness of approximately fifteen-thousandths of an inch, the preheating table 194 preferably applies sufficient heat to the top sheet 108 and the bottom sheet 110 until both sheets 108 & 110 reach a temperature that is greater than about 150° Fahrenheit and which is preferably between about 305° Fahrenheit and 315° Fahrenheit. Preferably, heating the sheets 108 & 110 until they reach the desired temperature also facilitates molding by enabling the sheets 108 & 110 to be joined to form the seal 66 of the bladder 40 by simply applying enough pressure against each sheet 108 & 110 in the seal region, preferably without requiring any adhesive between the sheets 108 & 110. For sheets constructed of a urethane having different thicknesses, routine testing and experimentation may be performed to determine the desired amount of heat to apply to each sheet to heat it to the desired temperature to enhance and preferably maximize forming and molding of each sheet in making a bladder 40 of this invention.

To maximize formability of each sheet 108 & 110, it may be desirable to maintain each sheet 108 & 110 at the desired preheat temperature for a predetermined period of time. Preferably, however, the top sheet 108 can be transferred to the upper mold 188 and the bottom sheet 110 transferred to the lower mold 186 after each sheet 108 & 110 reaches the desired preheat temperature. Preferably, each sheet 108 & 110 can be transferred to a mold for forming upon reaching the desired preheat temperature.

In a preferred embodiment of the bladder 40, such as the embodiment shown in FIG. 1, each sheet 108 & 110 is constructed of a relatively flexible and formable urethane having a thickness of approximately fifteen-thousandths of an inch and is heated to a temperature of between about 305° Fahrenheit and 315° Fahrenheit in preparation for forming and molding. If desired, a, urethane of another thicknesses could be used. Additionally, urethane sheets of two different thicknesses could also be used, such as if it is desired, for example, to construct the bladder 40 having its bottom sheet 110 thicker than the top sheet 108 to enable forces applied to the bladder 40 during use to be more uniformly distributed and transferred to the foam support cushion 100 (FIG. 4) of a seat Alternatively, the sheets 108 & 110 could be constructed of polyvinyl chloride, ethylene vinyl acetate, polyethylene, or another resilient, relatively flexible, formable, and moldable material that can be formed and molded into a bladder 40 of this invention having a seal 66 of good integrity and which is gas tight. Preferably, these materials can also be used to construct the bladder 40 if the blank 64 is constructed of only a single sheet or tubular piece of material.

C. Forming

Referring now to FIGS. 12–13, when preheating has been completed, each sheet 108 & 110 is transferred to a mold 186 & 188 where the sheets are three dimensionally formed to impart to the sheets the desired three dimensional bladder shape. To form the sheets 108 & 110, the preheating table 194 is brought between the upper mold 188 and lower mold 186, preferably by moving it along the rails 206. In preparation for transferring the top sheet 108 to the upper mold 188 and the bottom sheet 110 to the lower mold 186, the ram 190 is actuated, extending its piston 191 outwardly. As the piston 191 is extended, the upper mold 188 is brought downwardly to bear against the top sheet 108 and upper heating surface 196 of the preheating table 194, also urging the table 194 downwardly against the lower mold 186.

To transfer the top sheet 108 to the upper mold 188 and the bottom sheet 110 to the lower mold 186, a vacuum is applied preferably both to the lower mold 186 and upper mold 188. Preferably, during transfer of the sheets 108 & 110 to the molds 186 & 188, the vacuum to the preheating table 194 is cut off and pressure within the table 194 is allowed to rise towards ambient or atmospheric pressure levels. In fact, to facilitate transfer of the sheets 108 & 110, vacuum to the table 194 can be cut off and the table 194 can preferably slightly positively pressurized to prevent the sheets 108 & 110 from adhering to the table 194 during the transfer. Preferably, the table 194 can be positively pressurized to a pressure of about two pounds per square inch to facilitate removal of the sheets 108 & 110 from the table 194 and transfer of the sheets 108 & 110 to the molds 186 & 188. Preferably, application of a vacuum to the molds 186 & 188 and cutting off the vacuum to the table 194 is done substantially simultaneously to effect quick transfer of the sheets 108 & 110 to the molds 186 & 188.

With the application of a vacuum to the upper mold 188, and while the top sheet 108 preferably is still warm from preheating, the top sheet 108 is drawn against the three dimensionally contoured mold surface 230 of the upper mold 188 causing the sheet 108 to substantially conform to the mold surface 230, thereby forming the top sheet 108. With the application of a vacuum to the lower mold 186, and while the bottom sheet 110 is preferably still warm from preheating, the bottom sheet 110 is drawn against the three dimensionally contoured mold surface 230 of the lower mold 186 causing the sheet 110 to substantially conform to the mold surface 230, thereby forming the bottom sheet 110. To form each sheet, a vacuum of at least ten inches of mercury and preferably about eighteen inches of mercury is applied to each mold to draw the sheets against the mold surface 230.

After the sheets 108 & 110 have been transferred to the molds 186 & 188, the upper mold 188 is moved away from the preheating table 194 to enable the table 194 to be withdrawn from between the molds 186 & 188. After the upper mold 188 has been suitably retracted away from the preheating table 194, the table 194 is withdrawn from between the molds 186 & 188 and preferably returned to the position shown in FIG. 12 to begin preheating another pair of sheets 108 & 110 to be formed and molded into a bladder 40 of this invention.

D. Molding

After the preheating table 194 has been retracted, the molds are brought to bear against each other, such as is shown in FIG. 14, to join the sheets 108 & 110 together while the sheets 108 & 110 are preferably still hot to form a seal 66 defining the inflatable chambers and gas passages of the bladder 40 and defining the gas passages of the integral control flap 52. Preferably, a vacuum is applied to each mold 186 & 188 during molding to further facilitate forming of each sheet 108 & 110 during molding.

To bring the molds 186 & 188 to bear against each other, the piston 191 of the ram 190 is extended further outwardly until the mold surface 230 of the upper mold 188 is brought to bear against the mold surface 230 of the lower mold 186, sandwiching the sheets 108 & 110 between the molds 186 & 188. As a result of the molds 186 & 188 being accurately located relative to each other, the upraised wall portion 232 of each mold 186 & 188 preferably sandwiches the sheets 108 & 110 in the region where it is desired to form the seal 66 of the bladder 40. During molding, sufficient pressure is applied by the molds 186 & 188 to press the sheets 108 & 110 together in the seal region to join them together, airtightly forming the seal 66 and preferably also completing molding of the bladder 40.

Alternatively, if desired, the top sheet 108 could be joined to the bottom sheet 110 by ultrasonic welding, heat sealing, by use of an adhesive, or another sealing process to form the seal 66. Additionally, a combination of pressure from the molds 186 & 188 and one or more of the aforementioned joining methods, materials, or techniques could also be used in gas tightly forming the seal 66. Preferably, the seal 66 is sufficiently gas tight to permit each bladder chamber 68, 70 & 72 to be inflated to a pressure of at least two pounds per square inch and preferably can be inflated to a pressure of at least about six pounds per square inch to provide cushioning support to a seat occupant.

After the bladder 40 is allowed to cool for a sufficient period of time, the molds 186 & 188 are separated and the bladder 40 is removed. Preferably, the press 180 dwells at least ten seconds before separating the molds to allow removal of the bladder 40. Preferably, the dwell time is about twenty-five seconds before the molds separate.

Thereafter, if necessary, a trimming operation can be performed to trim excess sheet material from the periphery of the bladder chambers 68, 70 & 72 and control flap 52. Preferably, however, the molds 186 & 188 are constructed and arranged such that they automatically trim excess sheet material from the bladder 40 when the molds 186 & 188 are brought to bear against each other during molding. Alternatively, if desired, sheets 108 & 110 that are die cut to the desired size before preheating can be used to construct a bladder 40 that requires virtually no trimming after forming and molding have been completed.

III. Seat Assemblies

A. Motorcycle Seat

1. Single Bladder Construction

Figure 15:
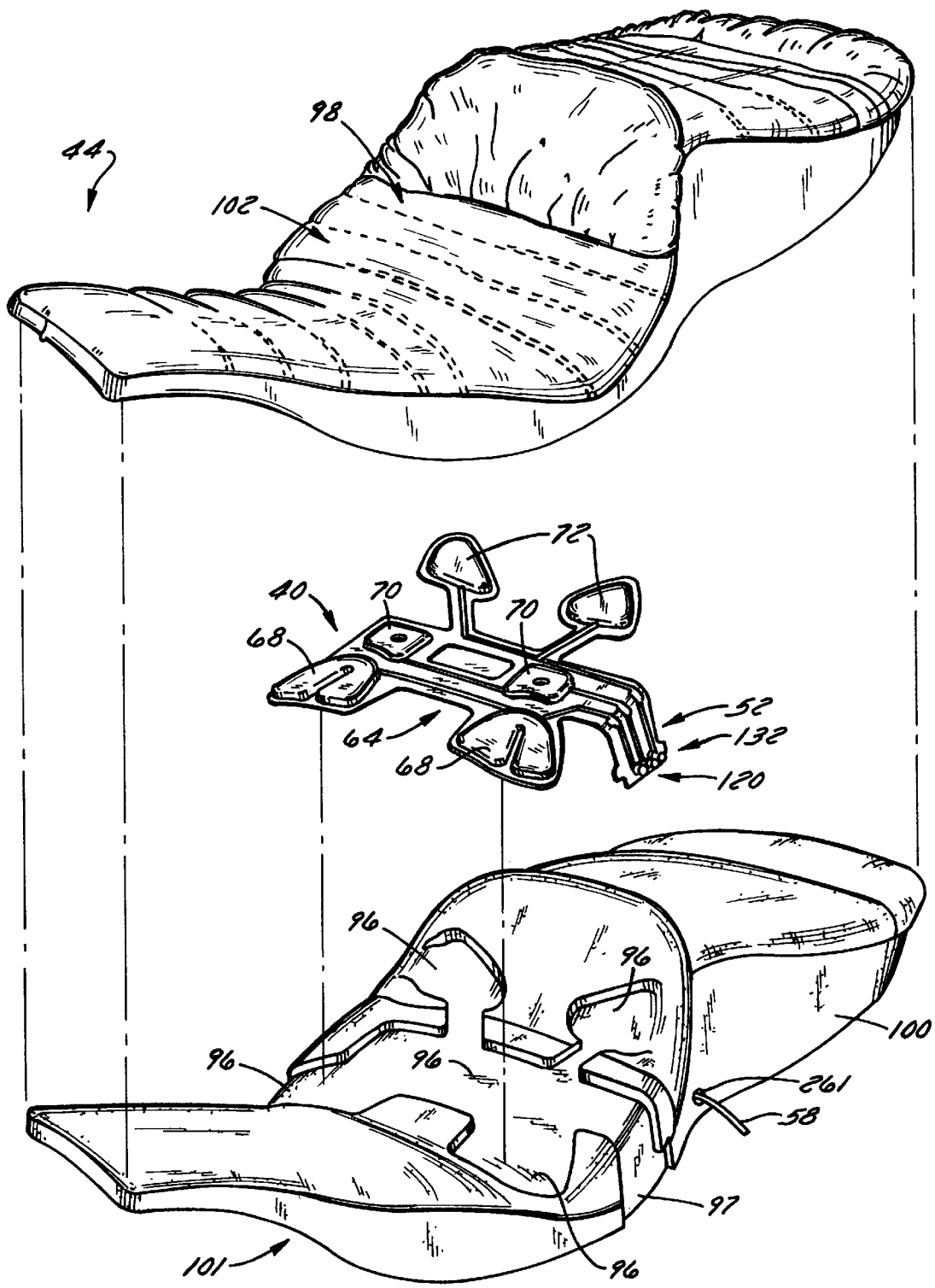
FIG. 15 is an exploded perspective view of a motorcycle seat having a seat saddle, a single bladder for the driver of the motorcycle, and a seat covering which overlies the saddle and bladder.
Figure 16A:
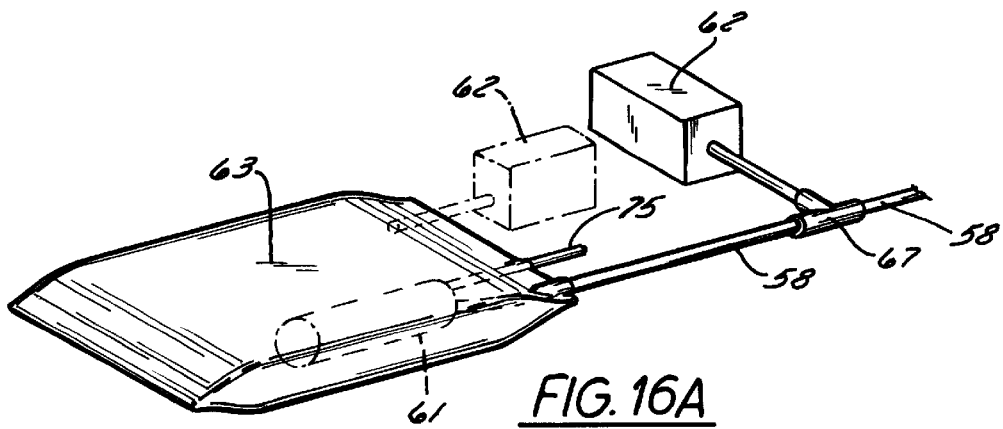
FIG. 16A is an enlarged fragmentary perspective view of the gas supply showing in more detail a reservoir having a compressor (in phantom) received in the reservoir and a pressure switch in communication with the reservoir for sensing the pressure of air within the reservoir for controlling operation of the compressor.
Figure 17:
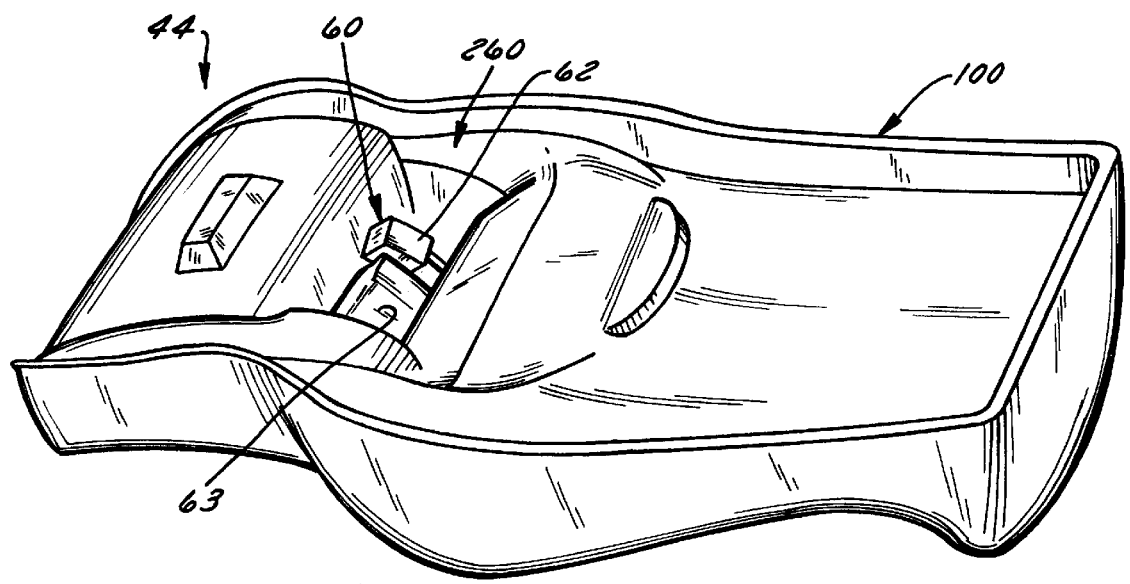
FIG. 17 is a bottom perspective view of the vehicle seat showing a retainer pocket in the seat saddle for receiving the air supply.

In the assembly of a motorcycle seat 44, such as the seat depicted in FIGS. 15 through 17, the valves 56 or valve assembly 160 are assembled to the control flap 52 of the bladder 40 preferably before the bladder is assembled to a seat 42. Before assembling the seat covering 102, the bladder 40 is preferably received in retainer pockets 96 (FIG. 4) in the seat occupant supporting surface 98 of the foam support cushion 100, such as a motorcycle seat saddle 101, that underlies the seat covering 102 when assembly is completed. When assembling the bladder 40 to the seat 42, the control flap 52 is also received in a retainer pocket 97 in the sidewall 50 of the foam support cushion 100.

Preferably, the retainer pockets 96 are pre-molded in the foam support cushion 100 before assembly. Alternatively, if the bladder 40 is suitably inflated, the retainer pockets 96 can be foam-in-place molded about the bladder 40 when making the foam support cushion 100 and before fitting the seat covering 102 over the cushion 100.

As is shown in FIG. 15, the retainer pockets 96 are located where the driver of the motorcycle, M (FIG. 1), would sit while driving the motorcycle, M. To enable the driver to be able to perform seat comfort adjustments to the bladder 40 while driving the motorcycle, M, the bladder 40 and control flap retainer pocket 97 are constructed and arranged to locate the control flap 52 within easy reach of the driver on the side of the seat 44 that preferably is opposite the throttle. For example, if the throttle is located on the right hand side handlebar of the motorcycle, M, the control flap 52 and its associated retainer pocket 97 are preferably located on the left hand side, as is depicted in FIG. 15, to enable the driver to make seat comfort adjustments to the bladder 40 during motorcycle operation without requiring the driver to remove their hand from the throttle.

Preferably, after the bladder 40 has been assembled to the support cushion 100, the gas supply 60 is connected to the control flap 52. As is shown in FIG. 16A, to assemble the gas supply 60, the compressor 61 is preferably received inside the reservoir bag 63 and the supply line 58 is connected to the outlet of the bag 63 and the inlet port 122 of the control flap 52 (FIG. 2). Alternatively, the compressor 61 could be exterior of the reservoir bag 63, if desired. The portion of the supply line 58 extending from the reservoir bag 63 is connected to the pressure switch T-fitting 67 and the portion of the supply line 58 leading to the control flap 52 with the pressure switch 62 being connected to the T-fitting 67.

Preferably, the gas supply 60 is received and retained in an out of the way location that protects the reservoir bag 63. Preferably, the gas supply 60 is located in a retainer pocket 260 underneath the seat. As is shown in FIG. 17, the retainer pocket 260 can be a pocket molded into the underside of the foam cushion 100. As is shown in FIG. 15, with the gas supply 60 received in the retainer pocket 260 in the underside of the seat cushion 100, the gas supply hose 58 is preferably routed through a bore 261 (FIG. 15) in the cushion adjacent the control flap retainer pocket 97 for easy connection to the bladder control flap 52.

Although the bladder 40 is shown having pinch valves 132 in its control flap and valve assembly 120, the bladder 40 could utilize a modified control flap construction 52' (FIG. 8) along with pneumatic valves 164, if desired. The seat 44 can also be constructed with a layer of foam overlying the bladder 40 and between the bladder 40 and seat covering 102, if desired.

2. Dual Bladder Construction

Figure 18:
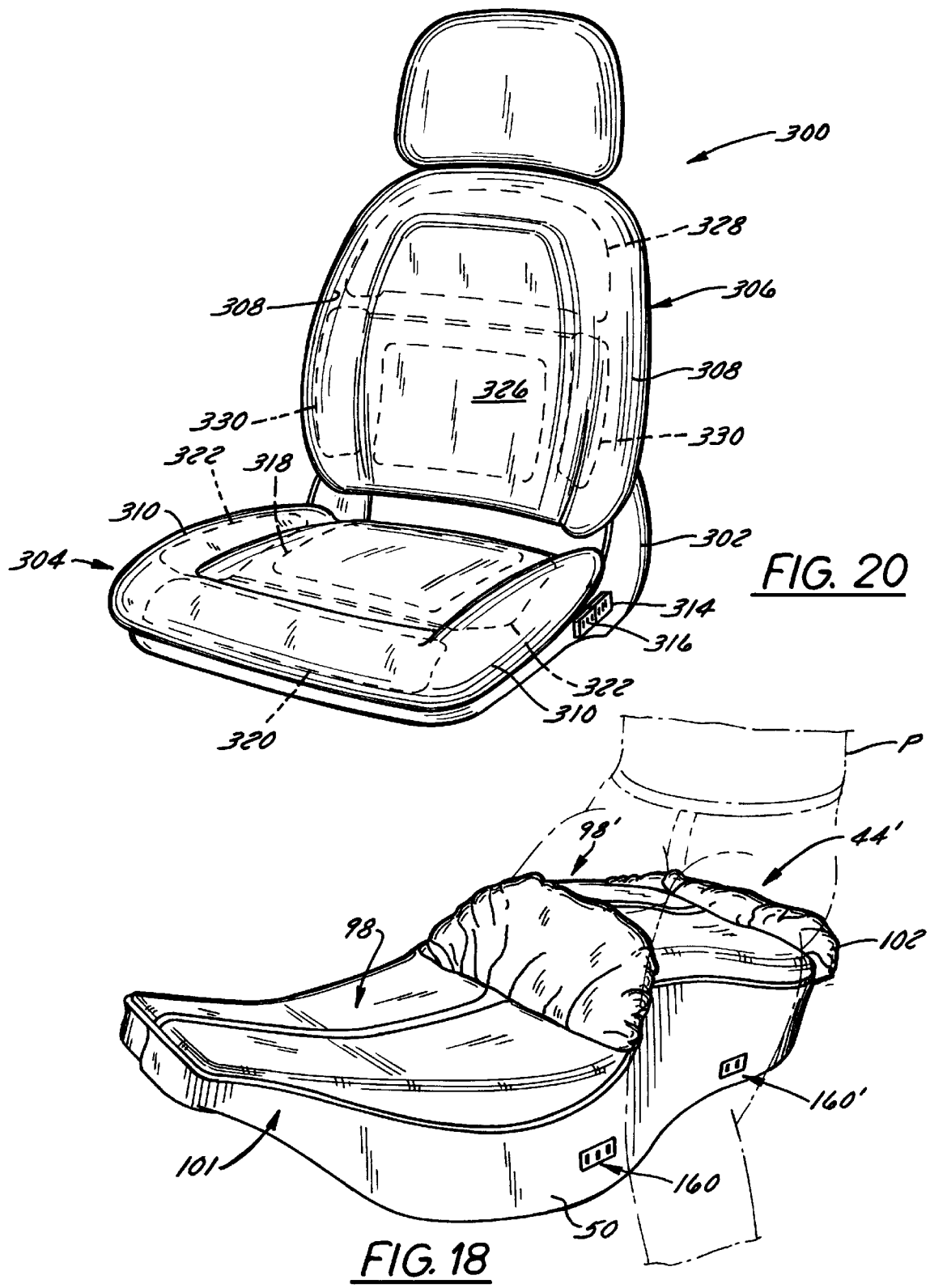
FIG. 18 is a perspective view of another motorcycle seat having a bladder for the driver, a bladder for a passenger, and pneumatic valving for controlling operation of each bladder.
Figure 19:
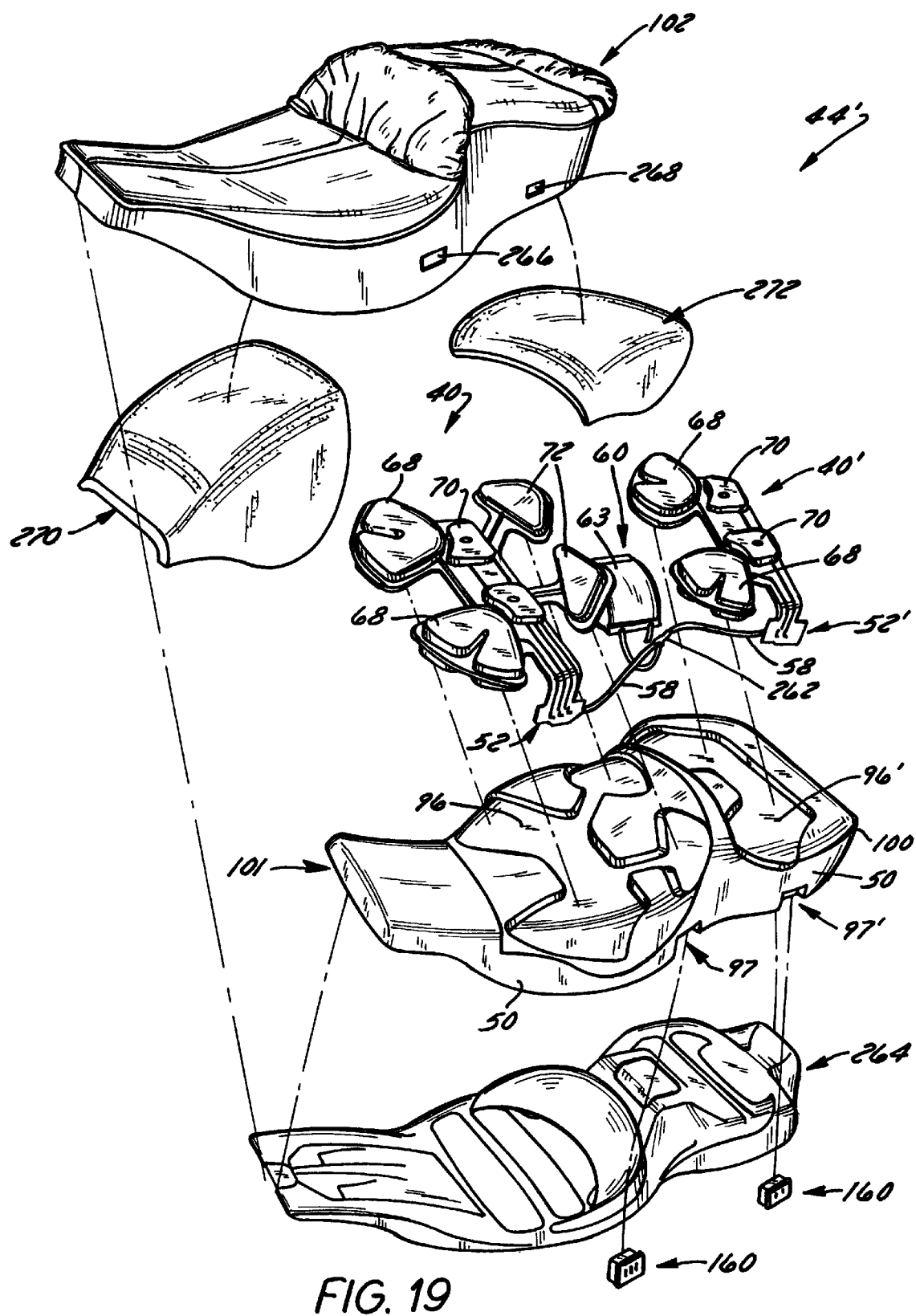
FIG. 19 is an exploded perspective view of the motorcycle seat depicting in more detail the first and second bladders, their air supply, and pneumatic valving.

FIGS. 18 & 19 illustrate a motorcycle seat 44' having a driver bladder 40, for providing adjustable comfort to a driver of a motorcycle, a passenger seat bladder 40', for providing adjustable comfort to a seat occupant that is a passenger, P, of the motorcycle, and a pair of control valve assemblies 160 & 160' for enabling controlled and selective inflation and deflation of each bladder chamber of each bladder 40 & 40'. As is shown in FIG. 18, the seat 44' has a covering 102 over both the driver seat occupant supporting surface 98 and the passenger seat occupant supporting surface 98'. To enable each chamber of each bladder 40 & 40' to be controllably and selectively inflated, the seat 44' has a driver pneumatic valve assembly 160 and passenger pneumatic valve assembly 160' received in the sidewall 50 of the seat 44'.

As is shown in FIG. 19, the driver seat bladder 40 preferably is of the same construction as the bladder 40 shown in FIG. 15. The passenger seat bladder 40' preferably has thigh chambers 68 and buttocks chambers 70 and lacks lumbar chambers 72, if the passenger seat occupant supporting surface 98' lacks a lumbar support region. Alternatively, if the motorcycle seat 44' is constructed with a lumbar support region, the passenger seat bladder 40' can be of a construction that is preferably virtually identical to the driver seat bladder 40 and which has a pair of lumbar chambers 72.

Although the gas supply 60' is shown in FIG. 19 without a pressure switch 62, the gas supply 60' for supplying both bladders 40 & 40' preferably can also be constructed having a pressure switch 62. To enable the gas supply 60' to supply gas to both bladders 40 & 40', the gas supply 60' is preferably connected by a T-fitting 262 to supply lines 58 in communication with each bladder 40 & 40'.

In assembly, the bladders 40 & 40' are received in retainer pockets 96 & 96' in the support cushion 100 which is preferably secured to a seat base 264 that is attached to a chassis of a motorcycle. Preferably, the control flap retainer pockets 97 & 97' in the support cushion 100 are recessed to accommodate pneumatic valve assemblies 160, if pinch valves are not used. To enable the pneumatic valve assemblies to be inserted through the seat covering 102 into the control flap retainer pockets 97 & 97', the seat covering has a pair of apertures 266 & 268 in its sidewall.

To cushion the bladders 40 & 40', the seat 44' preferably has a first foam pad 270 between the driver seat bladder 40 and the seat covering 102 and a second foam pad 272 between the passenger seat bladder 40' and seat covering 102. If desired, these pads 270 & 272 could be constructed as a one-piece, unitary assembly. Alternatively, if the seat covering is sufficiently padded, the seat 44' can be constructed without a separate layer of foam padding 270 & 272 between the bladders 40 & 40' and seat covering 102.

After the pads 270 & 272 are placed over the bladders 40 & 40', the seat covering 102 is fitted over the bladders 40 & 40', foam support cushion 100, and seat base 264 to complete assembly of the motorcycle seat 44'.

B. Vehicle Seat

Figure 21:
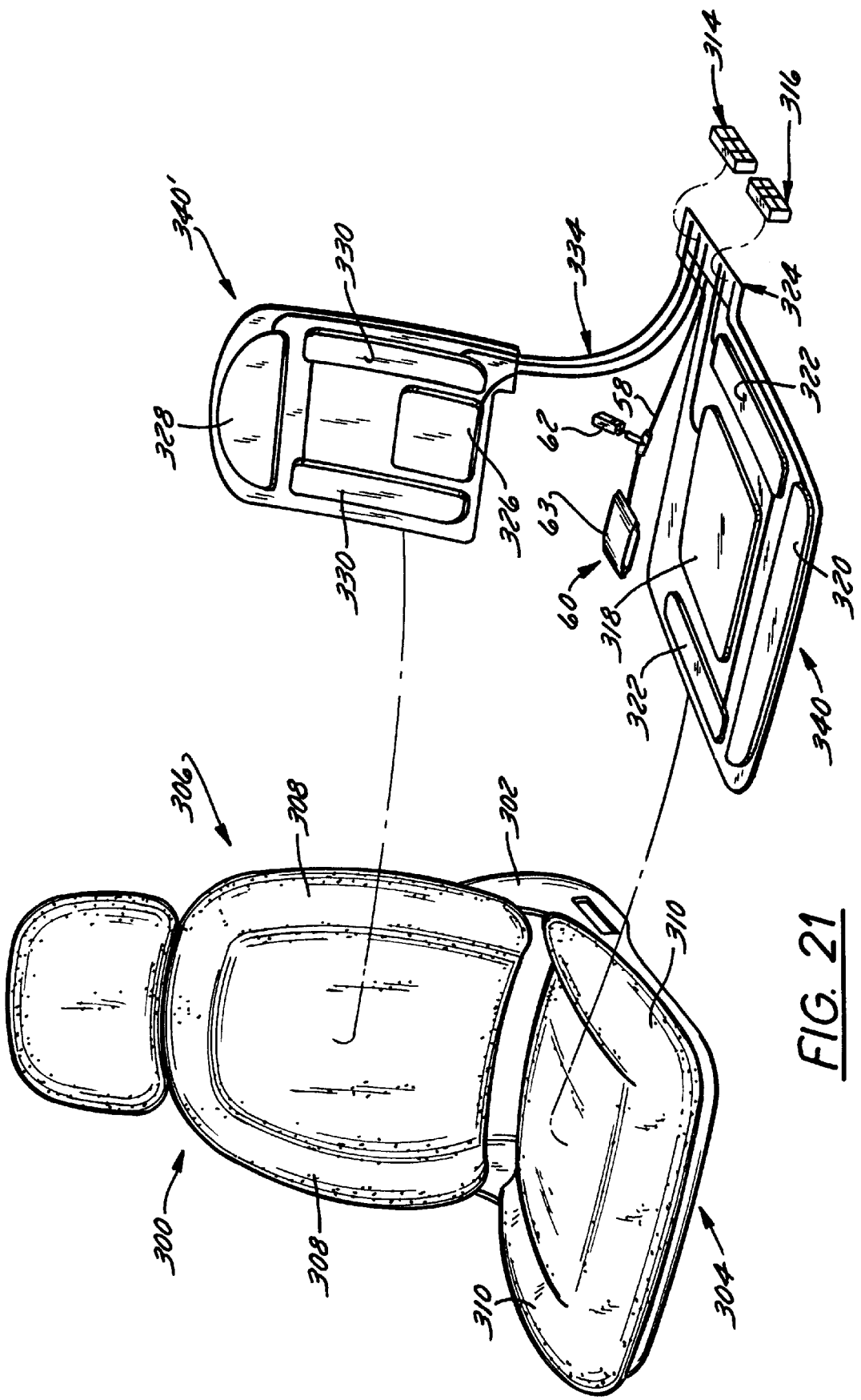
FIG. 21 depicts an exploded view of the vehicle seat of FIG. 20 showing the bladders in more detail.

FIGS. 20 & 21 illustrate two preferred embodiments of a bladder 340 & 340' of this invention for use in a vehicle seat 300, such as an automobile vehicle seat or an off-road vehicle seat. The seat has a chassis 302 that carries (a) a seat cushion 304 that functions as a seat occupant supporting surface to support the legs and buttocks of a seat occupant, and (b) a backrest cushion 306 that functions as a seat occupant supporting surface to support the back of a seat occupant.

As is depicted in FIGS. 20 & 21, the backrest 306 of the seat 300 has slightly outwardly extending and spaced apart side support panels 308 which preferably help locate an occupant in the seat 300 to properly position the seat occupant while also supporting the seat occupant along both sides of their back. The seat cushion 304 preferably has a pair of spaced apart and upraised bolsters 310, also for supporting and positioning a seat occupant. To support the thigh region of a seat occupant, the cushion 304 preferably also has a slightly upraised thigh support cushion region.

As is shown in FIG. 21, to provide selectively adjustable comfort to a seat occupant, the bladder cushioning system has a backrest bladder 340' with multiple chambers and which is of one piece, unitary construction. To provide support to the legs and buttocks of a seat occupant, the bladder system also has a seat cushion bladder 340 of multiple chamber construction and which is of one piece, unitary construction. To enable the chambers of each bladder 340 & 340' to be inflated, the bladder system has a gas supply 60. To insure that the reservoir bag 63 of the gas supply 60 always has a sufficient supply of gas to initiate inflation of one or more chambers of the bladders 340 & 340', the supply 60 preferably has a pressure switch 62 in communication with the gas compressor 61, which, in turn, is preferably received within the reservoir bag 63. To selectively inflate and deflate chambers of the bladders 340 & 340', the bladder system has a valve assembly 314 in communication with the backrest bladder 340' and another valve assembly 316 in communication with the seat cushion bladder 340.

To provide cushioning and support to the legs, thighs, and buttocks of a seat occupant, the seat cushion bladder 340 preferably has at least one selectively inflatable chamber underlying the buttocks and legs. As is shown in FIG. 21, the bladder 340 has at least one inflatable chamber 318 generally underlying the buttocks region. To provide adjustable support to the thighs and legs of the seat occupant, the bladder 340 preferably has a laterally extending inflatable chamber 320. To enable the bolsters 310 of the seat 300 to be adjusted, the bladder 340 preferably has a pair of spaced apart inflatable seat bolster chambers 322. To communicate gas between the seat bolster chambers 322, the chambers 322 preferably can be joined by a gas passage. To facilitate connection of the gas supply 60 and valves 314 & 316, the bladder 340 has a control flap 324 that preferably also is in communication with the backrest bladder 340'.

To provide cushioning and support to the backside of a seat occupant, the backrest bladder 340' has an inflatable chamber 326 for providing cushioning and support to the lower back or lumbar region of the seat occupant. To provide selectively adjustable cushioning and support to the upper back, the bladder 340' can be constructed with an inflatable chamber spaced 328 upwardly from the lumbar chamber 326. To provide cushioning and support while helping to position the seat occupant, the bladder 340' preferably also has a pair of spaced apart vertically extending side support chambers 330 which underlie the side support panels 308 of the seat 300.

To receive and exhaust gas from the bladder, the backrest bladder 340' preferably has a control flap 332 that is connected to the control flap 324 of the seat cushion bladder 340 by piping 334. Alternatively, the bladders 340 & 340' can be constructed with a single control flap connecting the two bladders together. Alternatively, other gas piping and control flap arrangements can also be used to distribute gas between the bladders 340 & 340' and to enable them to be selectively inflated and deflated.

IV. Use and Operation

In use, a bladder 40 and air supply system 60 of this invention can be used to provide adjustable support to a seat occupant of a vehicle seat 42, such as a motorcycle seat 44, or another type of vehicle seat 300 such as an automobile seat or off road vehicle seat. Additionally, the bladder 40 and air supply system 60 of this invention can also be used to provide adjustable support to a seat occupant of a seat other than a vehicle seat, such as an office chair, a recliner, or the like.

In operation, for the seat 42 shown in FIG. 1, after a vehicle equipped with a seat 42 having a bladder 40 of this invention has begun operation, such as after starting the vehicle, the pressure within the reservoir bag 63 is sensed by the pressure switch 62. If the pressure in the reservoir 63 is below the lower threshold pressure, $P_1$, the pressure switch 62 energizes the compressor 61 causing gas to be drawn into the reservoir 63 pressurizing the reservoir 63. The compressor 61 preferably remains energized until enough gas has been pumped into the reservoir 63 such that the pressure within the reservoir 63 rises equal to or above the upper threshold pressure, $P_2$. When the pressure within the reservoir 63 rises to a pressure that is at least equal to the upper threshold pressure, $P_2$, the pressure switch 62 preferably deenergizes the compressor 61 leaving the reservoir 63 fully charged and able to initiate inflation of one or more chambers of the bladder 40.

To inflate a chamber of the bladder 40, an associated valve is manually engaged by a seat occupant and urged from its gas retaining position toward its gas admitting position causing gas to be admitted from the reservoir 63 into the chamber. For example, if a seat occupant desires to inflate each lumbar chamber 72 of the bladder 40 shown in FIG. 1, the occupant engages the lumbar chamber valve 157 and urges it to its gas admitting position. When the chamber 72 has been inflated until it possesses the amount of firmness desired by the seat occupant, the seat occupant releases the valve 157 preferably causing the valve 157 to return to its gas retaining position.

During inflation, as is depicted more clearly in FIG. 2, gas flows from the reservoir 63, through the supply line 58, through the manifold passage 124 in the control flap 52, through a gas passage 84 in the bladder 40, and into the desired chambers 72. As gas flows from the reservoir 63, the gas pressure within the reservoir 63 drops. Should the gas pressure within the reservoir 63 drop below the lower threshold pressure, $P_1$, the pressure switch 62 energizes the compressor 61 causing the compressor 61 to recharge the reservoir 63, as well as, supply gas to the chambers 72 being inflated. When the pressure within the reservoir 63 at least reaches the upper threshold pressure, $P_2$, the pressure switch 62 deenergizes the compressor 61. Preferably, the compressor 61 is cycled in this manner, as gas is demanded, to maintain the desired pressure within the reservoir 63, to supply gas to the reservoir 63 for inflating the bladder 40.

To deflate a set of chambers 72 or simply remove air from the chambers 72 to adjust its firmness, the seat occupant engages the valve 157 associated with the chambers 72 and urges it to its gas exhausting position. When in the gas exhausting position, gas flows from the associated chambers 72, through its gas passage 84 in the bladder 40, through the outlet passage 128 in the control flap 52, out the exhaust port 130 (FIG. 5), and preferably into the atmosphere.

If, however, the gas supply 60 is a closed system, rather than the open system depicted in FIGS. 1 through 4, gas flows out the exhaust port 130 into a gas collector where it can be reused. Such closed system operation is advantageous where a gas other than air is being used to inflate the bladder 40 so that the gas can be recaptured and reused.

It is also to be understood that, although the foregoing description and drawings describe and illustrate in detail working embodiments of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims and the applicable prior art.

What is claimed is:

1. A gas bladder seat cushion comprising:
   a. a bladder having at least one inflatable chamber for holding gas integrally formed in said bladder, wherein said bladder is comprised of a first wall joined to a second wall;
   b. an inlet passageway integrally formed in said bladder for communicating gas to said inflatable chamber;
   c. a valve in gas flow communication with a tubular conduit;
   d. wherein one of said walls is separated from the other of said walls, defining a split line therebetween that forms an opening in said inlet passageway; and
   e. wherein said tubular conduit is received in said opening in said inlet passageway.

2. The gas bladder seat cushion of claim 1 comprising a pair of spaced apart inflatable chambers integrally formed in said bladder and an elongate interconnecting passageway formed integrally in said bladder for communicating gas between said inflatable chambers.

3. The gas bladder seat cushion of claim 2 further comprising a gas storage reservoir upstream of said inflatable chambers and said valve with said valve located downstream of said gas storage reservoir and upstream of said inflatable chambers wherein said gas storage reservoir is substantially gas-tight and stores gas.

4. The gas bladder seat cushion of claim 3 wherein said valve is carried by said bladder and is capable of controlling gas flow through said inlet passageway into one of said inflatable chambers.

5. The gas bladder seat cushion of claim 4 wherein said bladder is comprised of a pair of sheets of urethane joined by a seal.

6. The gas bladder seat cushion of claim 4 further comprising a base carrying said bladder and a seat covering that overlies said bladder.

7. The gas bladder seat cushion of claim 3 wherein said gas storage reservoir comprises a sealed bag and further comprising a pump that supplies gas to said sealed bag.

8. The gas bladder seat cushion of claim 7 wherein said pump comprises an electric air compressor.

9. The gas bladder seat cushion of claim 8 further comprising a pressure sensitive actuator for actuating said electric air compressor.

10. The gas bladder seat cushion of claim 7 wherein said gas storage reservoir comprises a pair of walls of a flexible gas impermeable material constructed and arranged to form said bag.

11. The gas bladder seat cushion of claim 10 wherein said walls are formed of a single sheet of said flexible gas impermeable material.

12. The gas bladder seat cushion of claim 11 wherein said sheet is comprised of a urethane.

13. The gas bladder seat cushion of claim 2 wherein said tubular conduit comprises a nipple of said valve.

14. A motorcycle seat comprising:
   a. a first occupant support surface;
   b. a second occupant support surface;
   c. a first gas bladder having a plurality of integral and independently inflatable chambers, said first gas bladder carried by said first occupant support surface;
   d. a second gas bladder having a plurality of integral and independently inflatable chambers, said second gas bladder carried by said second occupant support surface;
   e. a first control flap integrally formed in said first bladder and having an integral first gas passage that extends from one of said inflatable chambers to said first control flap;
   f. a second control flap integrally formed in said second bladder and having an integral second gas passage that extends from one of said inflatable chambers to said second control flap;
   g. a first valve operably associated with said first control flap for controlling gas flow through said first gas passage into one of said inflatable chambers in said first bladder;
   h. a second valve operably associated with said second control flap for controlling gas flow through said second gas passage into one of said inflatable chambers in said second bladder; and
   i. a gas pump capable of supplying gas to at least one of said inflatable chambers of one of said bladders.

15. The motorcycle seat of claim 14 further comprising:
   a motorcycle seat base having a top surface with a first top surface portion defining said first occupant support surface and a second top surface portion defining said second occupant support surface;

a seat covering overlying said first gas bladder;

a seat covering overlying said second gas bladder; and wherein said first gas bladder overlies said first occupant support surface and said second gas bladder overlies said second occupant support surface.

16. The motorcycle seat of claim 15 further comprising a sidewall and wherein 1) said first valve is carried by said sidewall so as to be manipulable by a first seat occupant sitting on the motorcycle seat such that said first seat occupant overlies said first gas bladder and 2) said second valve is carried by said sidewall so as to be manipulable by a second seat occupant sitting on the motorcycle seat in a position such that said second seat occupant overlies said second gas bladder.

17. The motorcycle seat of claim 16 wherein said first control flap and said second control are disposed adjacent said sidewall.

18. The motorcycle seat of claim 14 wherein said first bladder has a body from which said first control flap outwardly extends and said first control flap has a peninsula-shape that is narrower than said body of said first bladder and said second bladder has a body from which said second control flap outwardly extends and said second control flap has a peninsula-shape that is narrower than said body of said second bladder.

19. The motorcycle seat of claim 14 further comprising a gas storage reservoir disposed downstream of said gas pump and upstream of said first and second valves for supplying gas to said first and second valves.

20. The motorcycle seat of claim 19 further comprising a pressure sensitive actuator for actuating said pump.

21. The motorcycle seat of claim 20 wherein said gas storage reservoir consists of a single gas storage reservoir that is pressurized to a pressure greater than the pressure of gas in said inflatable chambers of said first and second bladders.

22. The gas bladder seat cushion of claim 2 further comprising a motorcycle seat saddle having an outer seat covering wherein said bladder is disposed between said motorcycle seat saddle and said outer seat covering such that said outer seat covering overlies said bladder.

23. The gas bladder seat cushion of claim 22 wherein the motorcycle seat saddle comprises a base and said bladder is carried by said base.

24. The gas bladder seat cushion of claim 23 further comprising a foam overlay disposed between said base and said bladder.

25. The gas bladder seat cushion of claim 23 further comprising a layer of foam disposed between said seat covering and said bladder.

26. The gas bladder seat cushion of 22 wherein one of said walls comprises a sheet of a flexible material and the other of said walls comprises another sheet of a flexible material.

27. A motorcycle seat comprising:

a. a motorcycle seat base having a seat covering;

b. an air bladder having a plurality of spaced apart integral and independently inflatable chambers disposed between said motorcycle seat base and said seat covering;

c. a first valve operably associated with one of said inflatable chambers and which can be manipulated by a seat occupant;

d. a second valve operably associated with the other of said inflatable chambers and which can be manipulated by a seat occupant; and e. wherein each of one of said inflatable chambers is defined by a top wall disposed toward said seat covering that is substantially flat, a bottom wall disposed toward said seat base, and a sidewall that is substantially orthogonal relative to said top wall.

28. The motorcycle seat of claim 27 wherein said air bladder has a body, in which said inflatable chambers are integrally formed, and an integral control flap that extends outwardly from said body that is narrower than said body, and further comprising a first gas passage integrally formed in said air bladder that extends from said control flap to one of said inflatable chambers and a second gas passage integrally formed in said air bladder that extends from said control flap to the other of said inflatable chambers wherein said first and second valves are carried by said control flap.

29. The motorcycle seat of claim 28 further comprising an electric air compressor.

30. The motorcycle seat of claim 27 wherein said sidewall and said top wall define corner where they meet and wherein said corner is rounded.

31. A motorcycle seat comprising:

a. a motorcycle seat base having a seat covering;

b. an air bladder having a plurality of spaced apart integral and independently inflatable chambers disposed between said motorcycle seat base and said seat covering;

c. a first valve operably associated with one of said inflatable chambers and which can be manipulated by a seat occupant;

d. a second valve operably associated with the other of said inflatable chambers and which can be manipulated by a seat occupant;

e. an electric air compressor for supplying air to inflate at least one of said inflatable chambers; and f. wherein said motorcycle seat base has a pair of spaced apart sidewalls that extend longitudinally relative to a motorcycle to which the motorcycle seat is mounted and a seat occupant having a pair of legs sits on the motorcycle seat with a part of one of said legs disposed alongside one of said sidewalls of said motorcycle seat base and a part of the other of said legs disposed alongside the other one of said sidewalls of said motorcycle seat base.

32. The motorcycle seat of claim 31 further comprising a gas storage reservoir that stores air used to inflate at least one of said inflatable chambers, said gas storage reservoir made of a sealed, flexible bag that receives air from said air compressor.

33. The motorcycle seat of claim wherein said first valve and said second valve are disposed adjacent one of said sidewalls of said motorcycle seat base and said first valve has an open position that permits air to enter and inflate one of said inflatable chambers and a closed position that opposes the flow of air into said one of said inflatable chambers and said second valve has an open position that permits air to enter and inflate another one of said inflatable chambers and a closed position that opposes the flow of air into said another one of said inflatable chambers.

34. The motorcycle seat of claim 31 wherein each of one of said inflatable chambers is defined by a top wall disposed toward said seat covering that is substantially flat, a bottom wall disposed toward said seat base, and a sidewall that is substantially orthogonal relative to said top wall.

35. The motorcycle seat of claim 31 wherein each of said inflatable chambers is comprised of a pair of spaced apart inflatable subchambers interconnected by an integral connecting gas passage.

36. The motorcycle seat of claim 35 wherein said pair of inflatable subchambers of one of said inflatable chambers is positioned to provide cushioning support to the femur and ischium of a seat occupant and said pair of inflatable subchambers of the other of said inflatable chambers is positioned to provide cushioning support to the tuberosity of ischium and ramus of ischium of said seat occupant.

37. The motorcycle seat of claim 36 further comprising another one of said integral and independently inflatable chambers having a pair of spaced apart subchambers interconnected by an integral connecting gas passage wherein said pair of said inflatable subchambers of said another one of said inflatable chambers is positioned to provide cushioning support to the posterior crest of ilium and erector spinae of said seat occupant.

38. A motorcycle seat comprising:
   a. a motorcycle seat base having a first occupant support surface for a driver, a second seat occupant support surface for a passenger, and an outer seat covering;
   b. a plurality of independently inflatable chambers disposed interjacent said first occupant support surface and said seat covering with a first air passage in gas flow communication with one of said inflatable chambers of said first air bladder and a second air passage in gas flow communication with another of said inflatable chambers of said first air bladder;
   c. a second air bladder having a plurality of independently inflatable chambers disposed interjacent said second occupant support surface and said seat covering with a first air passage in gas flow communication with one of said inflatable chambers of said second air bladder and a second air passage in gas flow communication with another of said inflatable chambers of said second air bladder, said second air bladder disposed above said second occupant support surface;
   d. a pump for supplying air to inflate at least one of said inflatable chambers of at least one of said air bladders; and
   e. wherein said motorcycle seat base has a pair of spaced apart sidewalls that extend longitudinally relative to a motorcycle to which the motorcycle seat is mounted and one of said passenger and said driver have a pair of legs with a part of one of said legs disposed alongside one of said sidewalls of said motorcycle seat base when sitting on the motorcycle seat and a part of the other of said legs disposed alongside the other one of said sidewalls of said motorcycle seat base when sitting on the motorcycle seat.

39. The motorcycle seat of claim 38 further comprising:
   1) a first valve operably associated with said first air passage in said first air bladder for controlling inflation of said one of said inflatable chambers of said first air bladder;
   2) a second valve operably associated with said second gas passage in said first air bladder for controlling inflation of said another of said inflatable chambers of said first air bladder;
   3) a third valve operably associated with said first air passage in said second air bladder for controlling inflation of said one of said inflatable chambers of said second air bladder;
   4) a fourth valve operably associated with said second air passage in said second air bladder for controlling inflation of said another of said inflatable chambers of said second air bladder; and
   5) wherein said first, second, third and fourth valves each have i) an open position that permits air flow into an associated one of said inflatable chambers and ii) a closed position that opposes air flow into said associated one of said inflatable chambers.

40. The motorcycle seat of claim 39 wherein said first occupant support surface and said second occupant support surface are formed in a single said motorcycle seat base and said pump comprises an electric air compressor.

41. The motorcycle seat of claim 39 further comprising a gas storage reservoir in gas flow communication with said first, second, third, and fourth valves wherein said electric air compressor provides air to said gas storage reservoir.

42. The motorcycle seat of claim 41 further comprising a pocket in said motorcycle seat base and wherein said gas storage reservoir and said electric air compressor are disposed in said pocket.

43. The motorcycle seat of claim 42 wherein said motorcycle seat base has an underside and said pocket is disposed in said underside of said motorcycle seat base.

44. A motorcycle seat comprising:
   a. a motorcycle seat base having a pair of sidewalls and an outer seat covering;
   b. a first sheet joined by a seal to a second sheet to form a flexible air bladder having body with a plurality of pairs of integral and independently inflatable chambers disposed interjacent said base and said outer seat covering, a first integral connecting air passage interconnecting said inflatable chambers of one of said pairs of inflatable chambers, a second integral connecting air passage interconnecting said inflatable chambers of another of said pairs of inflatable chambers, and a control flap extending outwardly from said body having a first supply passage in gas flow communication with one of said pairs of inflatable chambers and a second gas supply passage in gas flow communication with another of said pairs of inflatable chambers;
   c. a first valve that is disposed adjacent one of said sidewalls of said motorcycle seat base and which is operably associated with one of said pairs of inflatable chambers and which can be manipulated by a seat occupant;
   d. a second valve that is disposed adjacent one of said sidewalls of said motorcycle seat base and which is operably associated with another of said pairs of inflatable chambers and which can be manipulated by a seat occupant;
   e. a flexible air storage reservoir in gas flow communication with said first valve and said second valve;
   f. an electric air compressor in gas flow communication with said air storage reservoir; and
   g. wherein said control flap is disposed adjacent one of said sidewalls of said motorcycle seat base and said first valve and said second valve is carried by said control flap.

45. The motorcycle seat of claim 44 further comprising a pressure sensor electrically connected to said electric air compressor and which controls when said electric air compressor is energized.

46. The motorcycle seat of claim 45 wherein said pressure sensor comprises a pressure switch that senses the pressure of air in said air storage reservoir.

47. The motorcycle seat of claim 44 wherein each of one of said inflatable chambers is defined by a top wall disposed toward said seat covering that is substantially flat, a bottom wall disposed toward said seat base, and a sidewall that is substantially orthogonal relative to said top wall.

48. The motorcycle seat of claim 44 wherein said control flap further comprises a split line where one of said sheets is separated from the other of said sheets exposing said gas supply passages and said first valve has a conduit disposed between said sheets in gas flow communication with one of said gas supply passages and said second valve has a conduit disposed between said sheets in gas flow communication with the other of said gas supply passages.

49. The motorcycle seat of claim 48 wherein each one of said conduits comprises a fitting of a respective said valve.

50. The motorcycle seat of claim 44 further comprising a third sheet joined by a seal to a form sheet to form a second flexible air bladder having body with a plurality of pairs of integral and independently inflatable chambers disposed interjacent said base and said outer seat covering, a first integral connecting air passage interconnecting said inflatable chambers of one of said pairs of inflatable chambers, a second integral connecting air passage interconnecting said inflatable chambers of another of said pairs of inflatable chambers, and a control flap extending outwardly from said body having a first supply passage in gas flow communication with one of said pairs of inflatable chambers and a second gas supply passage in gas flow communication with another of said pairs of inflatable chambers.

* * * * *